United States Patent
Kawato et al.

(10) Patent No.: US 7,369,687 B2
(45) Date of Patent: May 6, 2008

(54) METHOD FOR EXTRACTING FACE POSITION, PROGRAM FOR CAUSING COMPUTER TO EXECUTE THE METHOD FOR EXTRACTING FACE POSITION AND APPARATUS FOR EXTRACTING FACE POSITION

(75) Inventors: Shinjiro Kawato, Kyoto (JP); Yasutaka Senda, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 724 days.

(21) Appl. No.: 10/716,870

(22) Filed: Nov. 20, 2003

(65) Prior Publication Data

US 2004/0161134 A1    Aug. 19, 2004

(30) Foreign Application Priority Data

Nov. 21, 2002    (JP)    ............................. 2002-338175

(51) Int. Cl.
*G06K 9/00*    (2006.01)

(52) U.S. Cl. .................................................. 382/118

(58) Field of Classification Search .................... None
See application file for complete search history.

(56) References Cited

U.S. PATENT DOCUMENTS 6,885,760 B2 *    4/2005    Yamada et al. ............. 382/118

2001/0031073 A1 *    10/2001    Tajima ........................ 382/118
2002/0150280 A1 *    10/2002    Li ................................ 382/117

FOREIGN PATENT DOCUMENTS

JP    2001-52176 A    2/2001

OTHER PUBLICATIONS

S. Kawato et al., "Real-time Detection of Between-the-Eyes with a Circle-Frequency Filter", Journal of IEICE, vol. J84-D-ii, No. 12, pp. 2577-2584, Dec. 2001.
S. Kawato et al., "Two-step Approach for Real-Time Eye Tracking", Technical Reports of IEICE, PRMU2000-63, pp. 15-22, Sep. 2000.
D. Chai et al., "Face Segmentation Using Skin-Color Map in Videophone Applications", IEEE Transactions on Circuits and Systems for Video Technology, vol. 9, No. 4, pp. 551-564, Jun. 1999.

(Continued)

*Primary Examiner*—Bhavesh M. Mehta
*Assistant Examiner*—Alex Liew
(74) *Attorney, Agent, or Firm*—McDermott Will & Emery LLP

(57) ABSTRACT

Prepare digital data of a value of each pixel within an object image region including a region of a human face. Then, successively, in the object image region, extract position of a Between-the-Eyes candidate point through a filtering process with a Between-the-Eyes detecting filter in which six rectangles Si ($1 \leq i \leq 6$) are connected. Further, extracting a portion of the object image in a prescribed size which has the extracted position of the Between-the-Eyes candidate point at a center, and select a true candidate point from said Between-the-Eyes candidate points in accordance with a pattern discriminating process.

15 Claims, 24 Drawing Sheets

OTHER PUBLICATIONS

J. Yang et al., "A Real-time Face Tracker", Proceedings of 3rd IEEE Workshop on Application of computer Vision, pp. 142-147, Dec. 1996.

H. Rowley et al., "Neural Network-Based Face Detection", IEEE Transactions on Pattern Analysis and Machine Intelligence, vol. 20, No. 1, pp. 23-38, Jan. 1998.

E. Hjelmas et al., "Face Detection: A Survey", Journal of Computer Vision and Image Understanding, 83(3), pp. 236-274, 2001.

B. Scassellati, "Eye Finding via Face Detection for a Foveated, Active Vision System", Proceedings of AAAI-98, pp. 969-976, 1998.

P. Viola et al., "Rapid Object Detection Using a Boosted Cascade of Simple Features", Proceedings of IEEE Conference on Computer Vision and Pattern Recognition, pp. 511-518, 2001.

H. Schneiderman et al., "Probabilistic Modeling of Local Appearance and Spatial Relationships for Object Recognition", Proceedings of IEEE Conference on Computer Vision and Pattern Recognition, pp. 45-51, 1998.

E. Osuna et al., "Training Support Vector Machines: An Application to Face Recognition", Proceedings of IEEE Conference on Computer Vision and Pattern Recognition, pp. 130-136, 1997.

\* cited by examiner

| S1 | S2 | S3 |
|----|----|----|
| S4 | S5 | S6 |

TEMPLATE FOR RIGHT EYE

FIG.20

PERFORMANCE EXAMINATION RESULT OF SIX-SEGMENTED RECTANGULAR FILTER (TOTAL 400)

| RECTANGULAR FILTER SIZE | SCALE OF SIZE | RECIPROCAL OF SCALE | NUMBER OF FAILURE (PIECES) | NUMBER OF CANDIDATE POINT (PIECES (AVERAGE)) | EXTRACTING RATE (%) |
|---|---|---|---|---|---|
| 24 × 12 | 0.3 | 3.3 | 13 | 17 | 96.8 |
| 36 × 18 | 0.6 | 1.67 | 11 | 8 | 97.25 |
| 48 × 24 | 0.8 | 1.25 | 15 | 5 | 96.25 |
| 60 × 30(REFERENCE) | 1.0 | 1.0 | 33 | 4 | 92.0 |
| 72 × 36 | 1.2 | 0.83 | 42 | 3 | 89.5 |
| 84 × 42 | 1.4 | 0.71 | 192 | 3 | 52.0 |

FIG.22

RELATIONSHIP AMONG FILTER SIZE,
PARALLAX AND EXTRACTING SIZE

| FILTER SIZE | FILTER SIZE | PARALLAX | EXTRACTING SIZE |
|---|---|---|---|
| 40 × 20 | — | 10~15 | 56 × 28 |
| | — | 15~20 | 52 × 26 |
| | — | 20~25 | 48 × 24 |
| | — | 25~30 | 44 × 22 |
| | 24 × 12 | 30~35 | 40 × 20 |
| | | 35~40 | 36 × 18 |
| — | | 40~45 | 32 × 16 |
| — | | 45~50 | 28 × 14 |
| — | | 50~55 | 24 × 12 |
| — | | 55~60 | 20 × 10 |

METHOD FOR EXTRACTING FACE POSITION, PROGRAM FOR CAUSING COMPUTER TO EXECUTE THE METHOD FOR EXTRACTING FACE POSITION AND APPARATUS FOR EXTRACTING FACE POSITION

BACKGROUND OF THE INVENTION

1. Field of the Invention

The present invention relates to an image processing for processing an image from a camera or the like, and specifically, to a field of image recognition for extracting human face from an image.

2. Description of the Background Art

By means of communications, a TV conference system for a plurality of persons at remote sites to hold a conference has been brought into practical use. Such a system, however, involves a problem that transmission of the video itself increases the amount of transmitted data. In order to address the problem, study has been made on a technique for extracting feature data for eye direction, face direction, facial expression and the like of the target person at each remote site, and transmitting only the extracted data between the sites. At the receiving side, an image of a virtual human face is created based on the data and displayed. Thus, the TV conference may be carried out efficiently while the amount of transmitted data is decreased.

Further, such a technique for detecting a person from an image has been widely studied also as a technique essential for the development in the field of human-computer interaction, gesture recognition, security and the like.

These applications of the human detection technique require to structure the stable system that satisfies the conditions of 1) high detection rate, 2) withstanding variation in illumination environment, and 3) operating in real time. Further, in the future, the necessity of the real-time human detection for a high-quality image (an image having a large number of pixels forming one screen) is expected to increase, and therefore development of faster human detection algorithm is required toward the future.

For human detection, the effective scheme is to detect the face first. The face has important information such as expression, and once the face is detected, estimation and search of the position of arms and legs become easier.

There have been many reports on a face detection system using skin-color information, as disclosed in Japanese Patent Laying-Open No. 2001-52176 or in the following References 1-4.

Reference 1: Shinjiro Kawato and Nobuji Tetsutani, "Real-time Detection of Between-the-Eyes with a Circle-Frequency Filter", Journal of IEICE, Vol. J84-DII, No. 12, pp. 2577-2584, December 2001.

Reference 2: Shinjiro Kawato and Nobuji Tetsutani, "Two-step Approach for Real-time Eye Tracking", Technical Reports of IEICE, PRMU2000-63, pp. 15-22, September 2000.

Reference 3: D. Chai and K. N. Ngan, "Face Segmentation Using Skin-Color Map in Videophone Applications", IEEE Transactions on Circuits and Systems for Video Technology, Vol. 9, No. 4, pp. 551-564, June 1999.

Reference 4: J. Yang and A. Waibel, "A Real-time Face Tracker", Proceedings of 3rd IEEE Workshop on Application of Computer Vision, pp. 142-147, December 1996.

According to these schemes, a skin-color region is extracted from an image to determine a face candidate region. As the face candidate region can be limited, the range of process is limited and the computation amount can be reduced significantly, which enables to structure a fast system. The scheme of using the color information, however, is susceptible to the variation in the illumination environment, and stable performance can not be expected when operated in general environment.

On the other hand, as for a face detection scheme not using the color information (but using brightness information), numerous schemes employing template matching or learning scheme such as neural network have been reported, as shown in References 5 and 6 below. These schemes are characterized by high detection rate and robustness to the illumination environment. For example, the technique disclosed in Reference 5 applies neural network to realize extremely high detection rate.

Reference 5: H. Rowley, S. Baluja, and T. Kande, "Neural Network-Based Face Detection", IEEE Transactions on Pattern Analysis and Machine Intelligence, Vol. 20, No. 1, pp. 23-38, January 1998.

Reference 6: E. Hjelmas and B. K. Low, "Face Detection: A Survey", Journal of Computer Vision and Image Understanding, 83(3), pp. 236-274, 2001.

These schemes, however, must match the whole image and a template (a model) varying the size, and hence involves a problem that the computation amount is large. Accordingly, since the large pixel size drastically increases the computation amount, structuring a real-time system is very difficult.

In the technique disclosed in Reference 7 shown below, a face is detected using brightness-darkness relations of mean brightness among segmented regions. The regions are distributed from the forehead to the chin in 16 segments, and therefore it is easily affected by the hairstyle or the beard.

Reference 7: Brian Scassellati, "Eye Finding via Face Detection for a Foveated, Active Vision System", Proceedings of AAAI-98, pp. 969-976, 1998.

The technique disclosed in the above-mentioned Japanese Patent Laying-Open No. 2001-52176 takes notice of the middle point between the eyes (hereinafter referred to as Between-the-Eyes) as a stable feature point of the face. Specifically, vicinity of Between-the-Eyes forms a pattern in which the forehead and the nose bridge are relatively bright, while the eyes and the eyebrows at opposing sides are dark. A circle frequency filter for detecting this pattern is employed.

The circle frequency filter, however, involves the problem that a pre-processing for extracting a skin-color region to limit the region is required and the face with the hair covering the eyebrows cannot be detected, since the pattern described above does not appear therein.

SUMMARY OF THE INVENTION

Accordingly, an object of the present invention is to provide an apparatus for extracting a face position that is capable of extracting a facial image from image information sup pressing the effect of illumination condition, hairstyles and the like, a method therefor and a program for realizing the method using a computer.

Another object of the present invention is to provide an apparatus for extracting a face position that is capable of locating the Between-the-Eyes of the face and tracking it in real time suppressing the effect of illumination condition, hairstyles and the like, a method therefor and a program for realizing the method using a computer.

According to one aspect of the present invention, a method for extracting a face position includes steps of:

preparing digital data of a value of each pixel within an object image region including a region of a human face; extracting in the object image region position of a Between-the-Eyes candidate point through a filtering process with a Between-the-Eyes detecting filter in which six rectangles are connected; and extracting a portion of the object image in a prescribed size which has the extracted position of the Between-the-Eyes candidate point at a center, and selecting a true candidate point from the Between-the-Eyes candidate points in accordance with a pattern discriminating process.

Preferably, the Between-the-Eyes detecting filter is one rectangle divided into six segments.

Preferably, the six rectangles includes two first rectangles adjacent to each other in a vertical direction, two second rectangles displaced relative to the first rectangles by a prescribed amount in the vertical direction, and adjacent to each other in the vertical direction, and two third rectangles displaced relative to the second rectangles by a prescribed amount in the vertical direction, and adjacent to each other in the vertical direction.

Preferably, the step of selecting a true candidate point includes steps of: detecting positions of eyes through a pattern discriminating process with respect to the object image that corresponds to prescribed two rectangles among rectangles forming the Between-the-Eyes detecting filter; correcting the position of the Between-the-Eyes candidate point to a middle point between two eyes based on the detected positions of the eyes; rotating an input image around the corrected position of Between-the-Eyes candidate point such that the two eyes are aligned horizontally; and extracting from the rotated input image a portion of the object image in a prescribed size which has the corrected position of the Between-the-Eyes candidate point at a center, and selecting a true candidate point from the Between-the-Eyes candidate points in accordance with a pattern discriminating process.

Preferably, the step of preparing digital data includes a step of preparing the object image as a stereo image. The step of selecting a true candidate point includes a step of selecting a true candidate point from the Between-the-Eyes candidate points in accordance with a distance to the Between-the-Eyes candidate point from an observation point that is detected based on the stereo image.

According to another aspect of the present invention, a program product for causing a computer to execute a method for extracting a face position within an object image region, the program product causing the computer to execute steps of: preparing digital data of a value of each pixel within an object image region including a region of a human face; extracting in the object image region position of a Between-the-Eyes candidate point through a filtering process with a Between-the-Eyes detecting filter in which six rectangles are connected; and extracting a portion of the object image in a prescribed size which has the extracted position of the Between-the-Eyes candidate point at a center, and selecting a true candidate point from the Between-the-Eyes candidate points in accordance with a pattern discriminating process.

Preferably, the Between-the-Eyes detecting filter is one rectangle divided into six segments.

Preferably, the six rectangles includes two first rectangles adjacent to each other in a vertical direction, two second rectangles displaced relative to the first rectangles by a prescribed amount in the vertical direction, and adjacent to each other in the vertical direction, and two third rectangles displaced relative to the second rectangles by a prescribed amount in the vertical direction, and adjacent to each other in the vertical direction.

Preferably, the step of selecting a true candidate point includes steps of: detecting positions of eyes through a pattern discriminating process with respect to the object image that corresponds to prescribed two rectangles among rectangles forming the Between-the-Eyes detecting filter; correcting the position of the Between-the-Eyes candidate point to a middle point between two eyes based on the detected positions of the eyes; rotating an input image around the corrected position of Between-the-Eyes candidate point such that the two eyes are aligned horizontally; and extracting from the rotated input image a portion of the object image in a prescribed size which has the corrected position of the Between-the-Eyes candidate point at a center, and selecting a true candidate point from the Between-the-Eyes candidate points in accordance with a pattern discriminating process.

Preferably, the step of preparing digital data includes a step of preparing the object image as a stereo image. The step of selecting a true candidate point includes a step of selecting a true candidate point from the Between-the-Eyes candidate points in accordance with a distance to the Between-the-Eyes candidate point from an observation point that is detected based on the stereo image.

According to still another aspect of the present invention, an apparatus for extracting a face position includes: an imaging unit preparing digital data of a value of each pixel within an object image region including a region of a human face; an extracting unit extracting in the object image region position of a Between-the-Eyes candidate point through a filtering process with a Between-the-Eyes detecting filter in which six rectangles are connected; and a selecting unit extracting a portion of the object image in a prescribed size which has the extracted position of the Between-the-Eyes candidate point at a center, and selecting a true candidate point from the Between-the-Eyes candidate points in accordance with a pattern discriminating process.

Preferably, the Between-the-Eyes detecting filter is one rectangle divided into six segments.

Preferably, the six rectangles includes two first rectangles adjacent to each other in a vertical direction, two second rectangles displaced relative to the first rectangles by a prescribed amount in the vertical direction, and adjacent to each other in the vertical direction, and two third rectangles displaced relative to the second rectangles by a prescribed amount in the vertical direction, and adjacent to each other in the vertical direction.

Preferably, the selecting unit includes: an eye detecting unit detecting positions of eyes through a pattern discriminating process with respect to the object image that corresponds to prescribed two rectangles among rectangles forming the Between-the-Eyes detecting filter; a correcting unit correcting the position of the Between-the-Eyes candidate point to a middle point between two eyes based on the detected positions of the eyes; a rotating unit rotating an input image around the corrected position of Between-the-Eyes candidate point such that the two eyes are aligned horizontally; and a discriminant process unit extracting from the rotated input image a portion of the object image in a prescribed size which has the corrected position of the Between-the-Eyes candidate point at a center, and selecting a true candidate point from the Between-the-Eyes candidate points in accordance with a pattern discriminating process.

Preferably, the imaging unit includes a preparing unit preparing the object image as a stereo image. The selecting unit includes a select processing unit selecting a true candidate point from the Between-the-Eyes candidate points in accordance with a distance to the Between-the-Eyes candidate point from an observation point that is detected based on the stereo image.

As above, according to the present invention, position of a person or the face thereof, in special the position of Between-the-Eyes and the eyes, can be detected from a successive screen information in real-time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 shows in which range the Between-the-Eyes candidate point can be detected for the same face image with six-segmented rectangular filters of different sizes.

FIG. 22 shows the relationship among the size of six-segmented rectangular filter, parallax and the size for extracting the candidate region being set based on FIG. 21.

DESCRIPTION OF THE PREFERRED EMBODIMENTS

First Embodiment

Hardware Configuration

Figure 1:
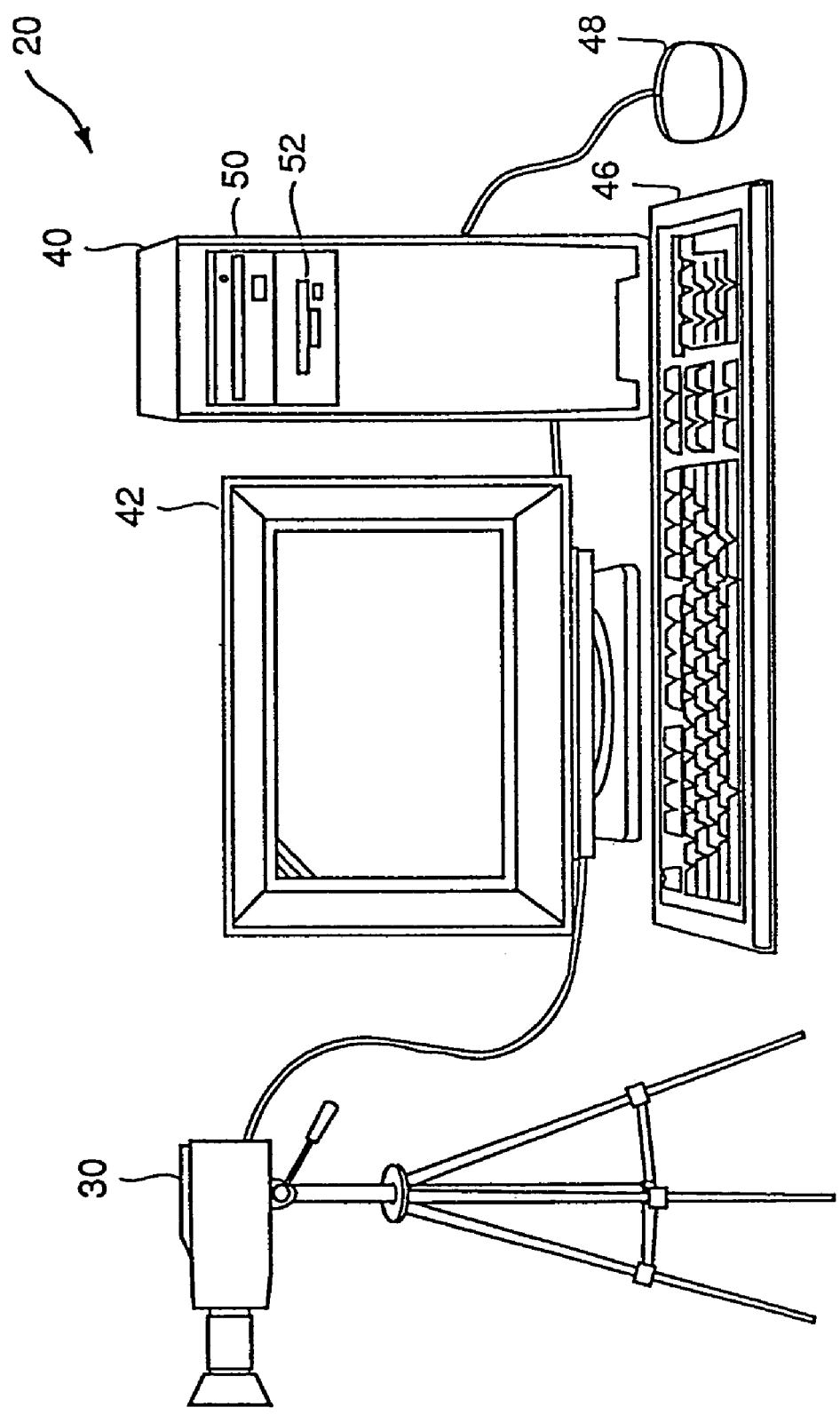
FIG. 1 shows the external view of a system according to the first embodiment of the present invention.

In the following, a face position extracting apparatus according to a first embodiment of the present invention will be described. The face position extracting apparatus is realized by software executed on a computer, such as a personal computer or a work station, and it is for extracting the face of a person from an object image, and further for detecting the positions of Between-the-Eyes and the eyes from a video image of the human face. FIG. 1 shows the external view of the face position extracting apparatus.

Referring to FIG. 1, this system 20 includes a computer body 40 having a CD-ROM (Compact Disc Read-Only Memory) drive 50 and an FD (Flexible Disc) drive 52, a display 42 as a display apparatus connected to computer body 40, a keyboard 46 and a mouse 48 as input apparatuses also connected to computer body 40, and a camera 30 connected to computer body 40 for picking up an image. In the apparatus according to the present embodiment, a video camera including CCD (solid imaging element) is used as camera 30, to perform a process of detecting the position of Between-the-Eyes or the eyes of a person operating system 20 in front of camera 30.

Specifically, digital data of the value of each pixel within a region of an object image including a human face region is prepared by camera 30.

Figure 2:
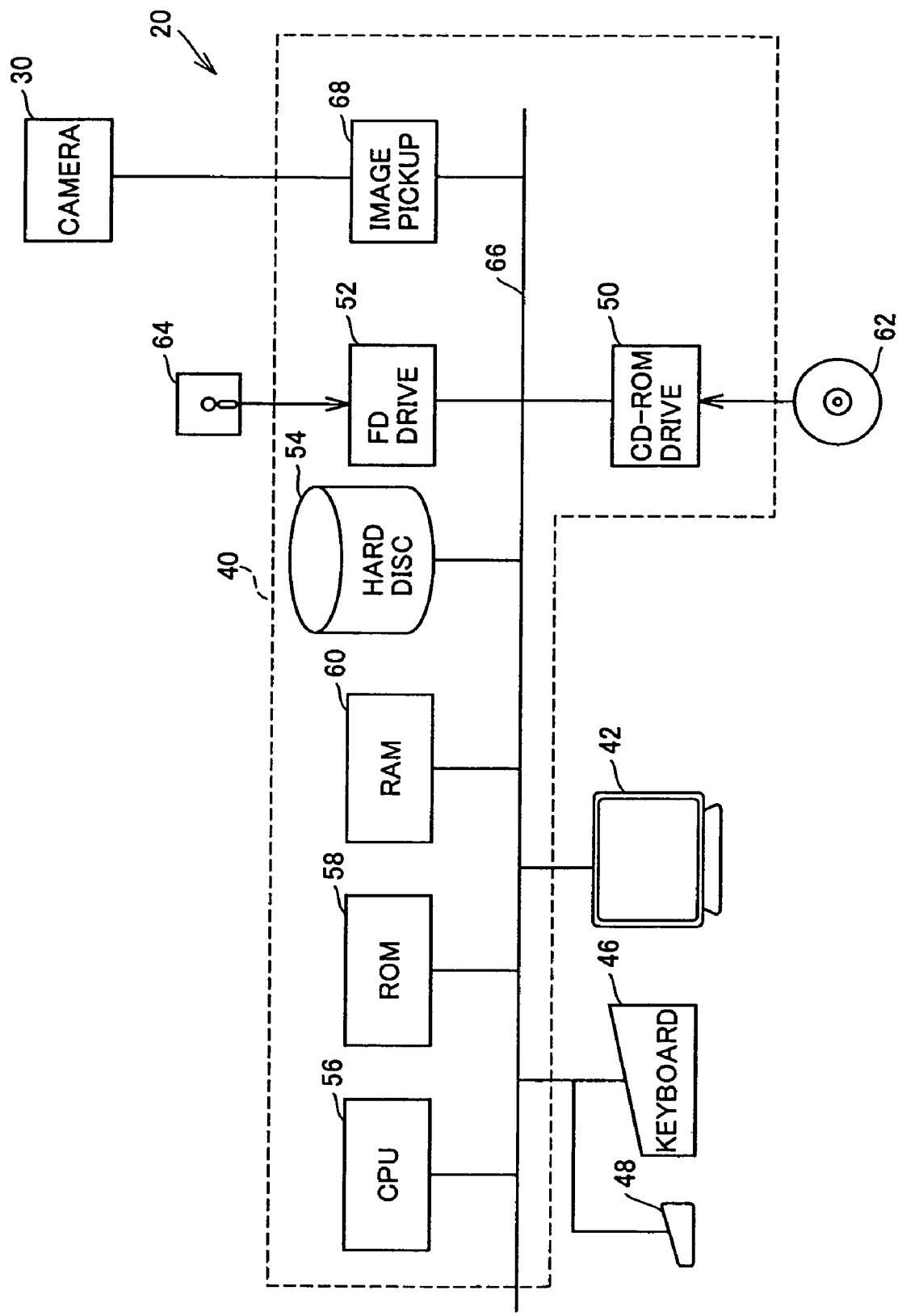
FIG. 2 is a block diagram showing hardware configuration of the system according to the first embodiment of the present invention.

FIG. 2 shows the configuration of system 20 in block diagram. As shown in FIG. 2, computer body 40 structuring system 20 includes, in addition to CD-ROM drive 50 and FD drive 52, CPU (Central Processing Unit) 56, ROM (Read Only Memory) 58, RAM (Random Access Memory) 60, hard disc 54, and an image pickup apparatus 68 for picking up an image from camera 30, each connected to a bus 66. CD-ROM 62 is loaded in CD-ROM drive 50. FD 64 is loaded in FD drive 52.

As mentioned above, main part of the face position extracting apparatus is realized by the computer hardware and the software executed by CPU 56. Generally, such software is distributed as stored in a storage medium such as CD-ROM 62 or FD 64, and read therefrom by CD-ROM drive 50 or FD drive 52 to be temporally stored in hard disc 54. Alternatively, when the apparatus is connected to a network, it is once copied from a server on the network to hard disc 54. Then it is further read from hard disc 54 to RAM 60 to be executed by CPU 56. When connected to the network, it may not be stored in hard disc 54 and may be directly loaded into RAM 60 for execution.

The computer hardware shown in FIGS. 1 and 2 and the operating principle thereof are of general nature. Therefore, the most essential part of the present invention is the software stored in the storage medium such as FD 64 and hard disc 54.

As a recent general trend, a commonly employed scheme is to prepare various program modules as part of operating system of a computer in advance, such that an application program calls the modules in a prescribed sequence as needed for processing. In such a case, the software for realizing the face position extracting apparatus itself does not include such a module, and only when it cooperates with the operating system at the computer, the face position extracting apparatus is realized. So long as a general platform is employed, however, it is not required to distribute software containing such a module, and it can be contemplated that those software not containing such a module and the recording medium recording the software (and data signals when such software is distributed on the network) constitute the embodiment.

Basic Principle of Face Image Extraction

First, the procedure of the present invention is outlined. When processing a video image in which a face is successively recorded, the screen is scanned with a rectangular filter, of which width is as long as the width of the face and the height is about a half thereof. The rectangle is divided into six segments by 3×2, for example. The average brightness for each segment is calculated. When their relative brightness-darkness relation satisfies a certain condition, the center of the rectangle is employed as a candidate for Between-the-Eyes.

When successive pixels become the candidates for Between-the-Eyes, only the center of a frame surrounding the pixels is saved for the Between-the-Eyes candidate. Carrying out template matching or the like by comparing the saved the Between-the-Eyes candidate with a standard pattern, false Between-the-Eyes candidates are discarded and the true Between-the-Eyes candidate is extracted among the Between-the-Eyes candidates obtained through the procedure described above.

In the following, the procedure of face detection of the present invention will further be detailed.

Six-Segmented Rectangular Filter

Figure 3:
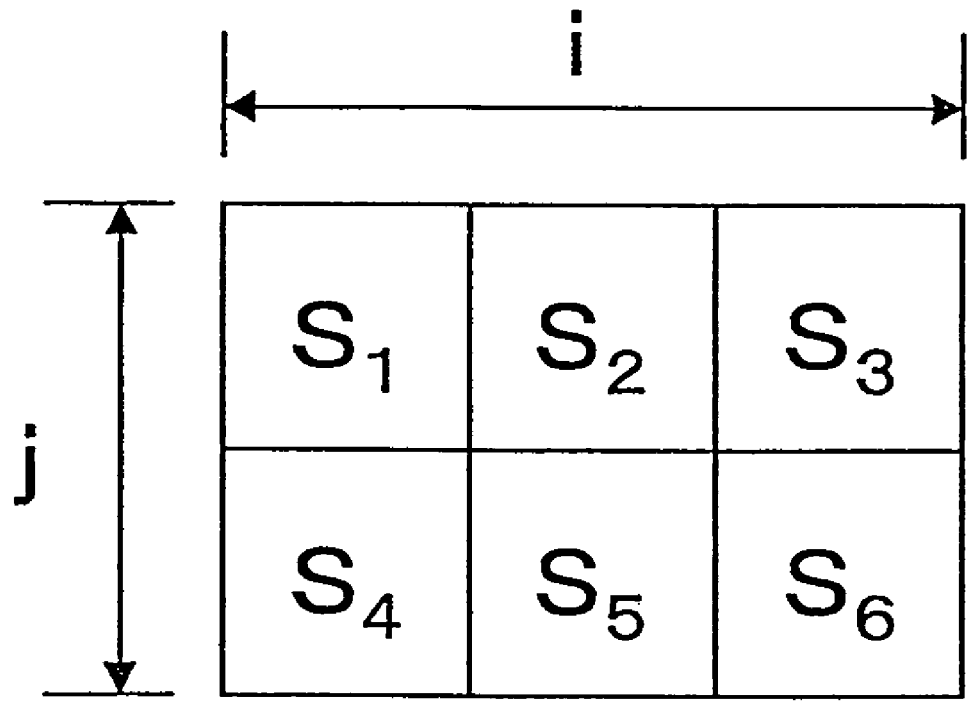
FIG. 3 shows a six-segmented rectangular filter.

FIG. 3 shows the above described rectangular filter that is divided into six segments by 3×2 (hereinafter referred to as "a six-segmented rectangular filter").

The six-segmented rectangular filter is for extracting the face feature that 1) the nose bridge is brighter than both of the eye regions, and 2) the eye regions are darker than cheek regions, to discriminate the position of Between-the-Eyes of the face. A rectangular frame is provided, of which center is at point (x, y), and which has a width of i pixels and a height of j pixels (i, j: natural numbers).

As shown in FIG. 3, the width of this rectangular frame is divided by three and the height is divided by two, to have six blocks S1-S6.

Figures 4A, 4B:
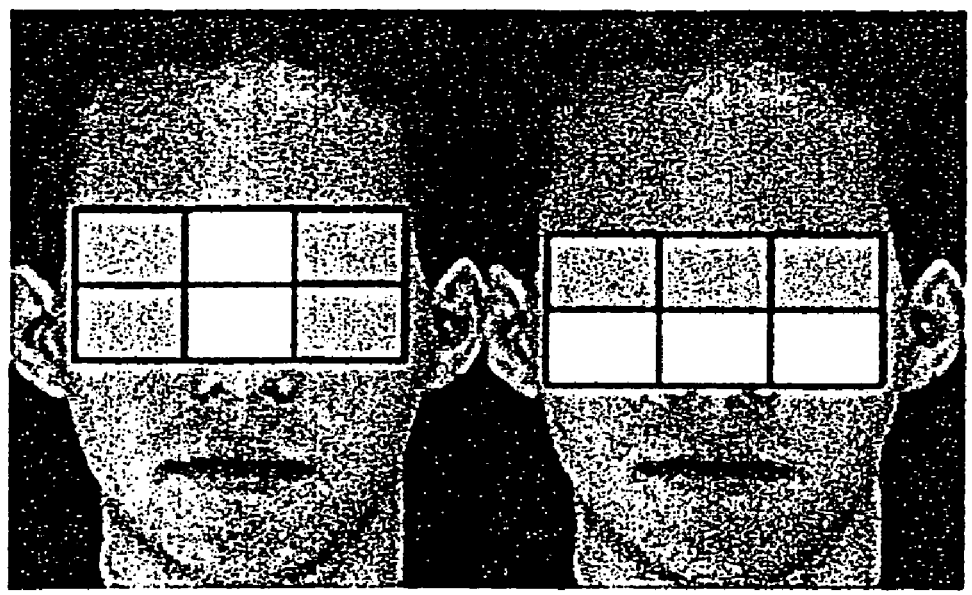
FIGS. 4A and 4B are conceptual illustrations where the six-segmented rectangular filter is applied on a face image.

FIGS. 4A and 4B are conceptual illustrations where the six-segmented rectangular filter is applied to a face image. FIG. 4A shows the shape of the six-segmented rectangular filter, while FIG. 4B shows the state where the six-segmented rectangular filter is applied on the eye regions and the cheek regions.

Figure 5:
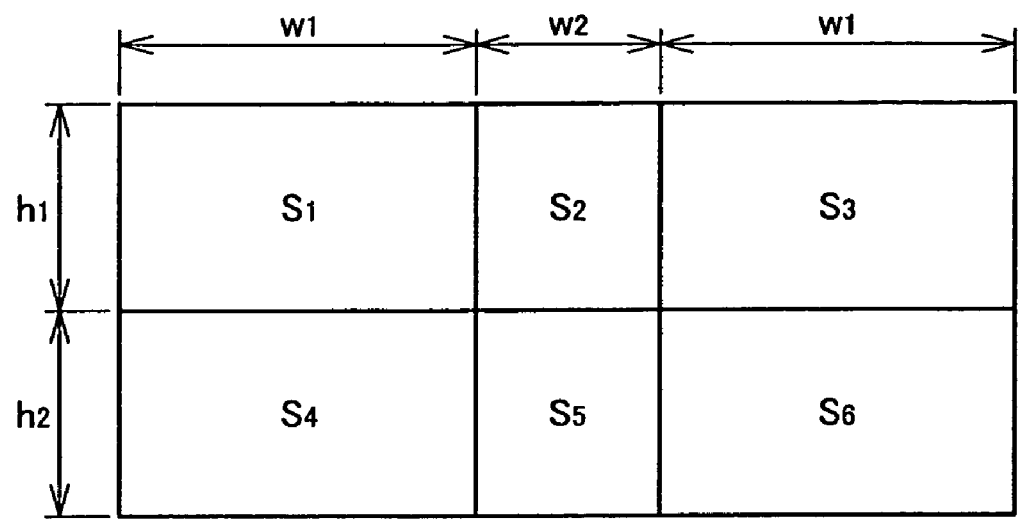
FIG. 5 is a conceptual illustration showing another configuration of six-segmented rectangular filter.

Considering that the nose bridge part is usually narrower than the eye region, the width w2 of each of blocks S2 and S5 is desirably narrower than the width w1 of each of blocks S1, S3, S4 and S6. Preferably, width w2 may be half of width w1. FIG. 5 is a conceptual illustration showing the configuration of the six-segmented rectangular filter in such a case.

In the first embodiment, it is assumed that the six-segmented rectangular filter as shown in FIG. 5 is employed.

Though the height h1 of each of blocks S1, S2 and S3 and height h2 of each of blocks S4, S5 and S6 may not necessarily be the same, in the following description it is assumed that height h1 and height h2 are equal.

In the six-segmented rectangular filter shown in FIG. 5, for each block Si ($1 \leq i \leq 6$), the average value of the brightness of pixels "bar Si" (Si with a superscript of "–") is determined.

Assuming that one eye and eyebrow are in block S1, while the other eye and eyebrow are in block S3, then the following relational expression (1) is satisfied:

$$\overline{S_1} < \overline{S_2} \text{ and } \overline{S_1} < \overline{S_4} \qquad (1)$$
$$\overline{S_3} < \overline{S_2} \text{ and } \overline{S_3} < \overline{S_6}$$

Figure 6:
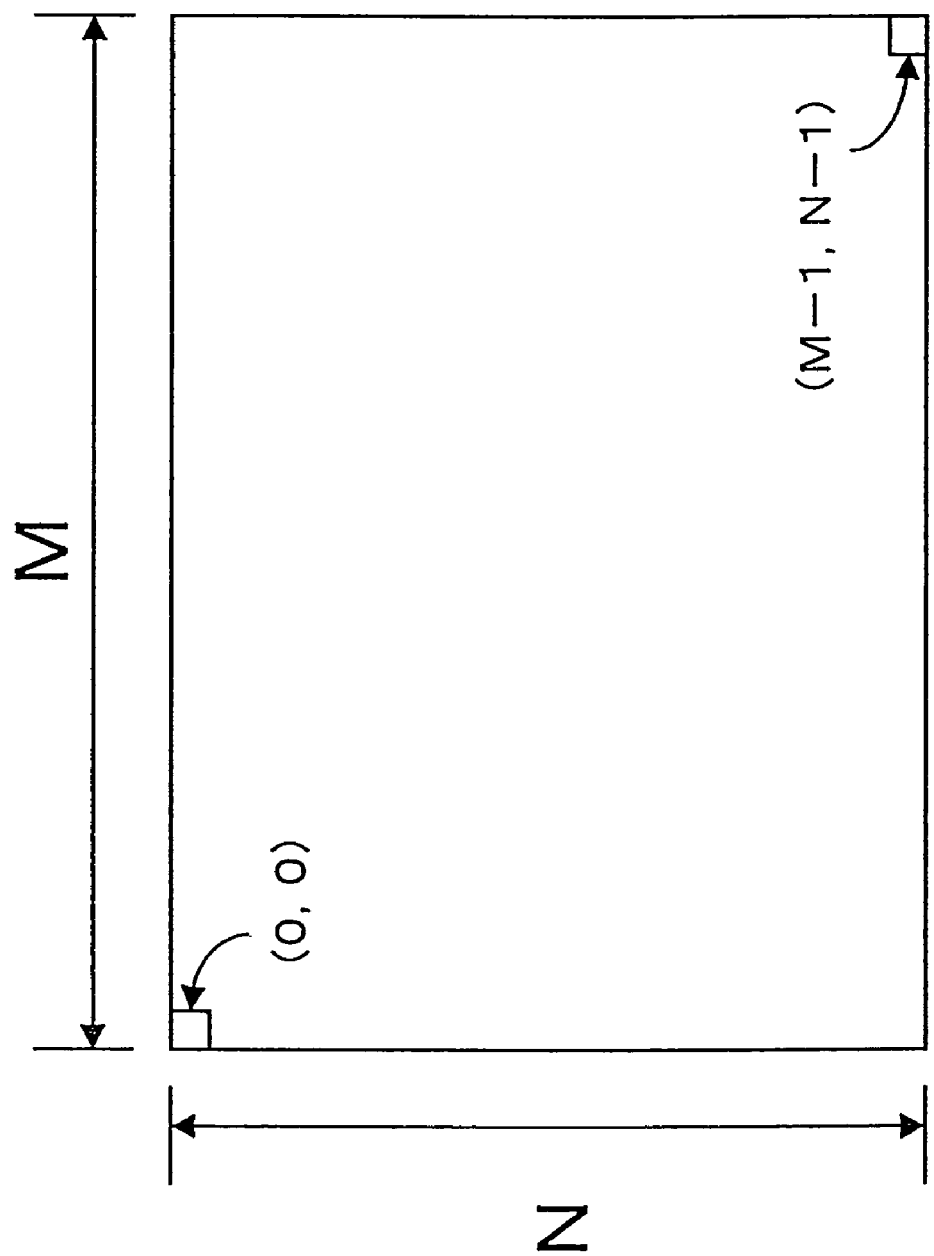
FIG. 6 is a conceptual illustration showing an image to be the object of scanning with segmented rectangular filter.

FIG. 6 is a conceptual illustration showing an image as an object to be scanned with such a six-segmented rectangular filter.

As shown in FIG. 6, the object image from which a face image is detected is configured with M×N pixels, having M pixels in width and N pixels in height. In principle, the six-segmented rectangular filter may be applied thereto, starting from the upper left pixel (0, 0) and sequentially shifting in width and height directions by one pixel, to check the validity of the relational expression (1). It is not efficient, however, to determine the average value of the brightness in each block every time the six-segmented rectangular filter is shifted.

Accordingly, in the present invention, to the process of determining the total sum of the pixels in the rectangle frame, a calculation acceleration scheme using an integral image is employed, which is disclosed in a known reference (P. Viola and M. Jones, "Rapid Object Detection Using a Boosted Cascade of Simple Features", Proceedings of IEEE Conference on Computer Vision and Pattern Recognition, pp. 511-518, 2001).

From an image i(x, y), the "integral image" can be defined by the following expression (2):

$$ii(x, y) = \sum_{x' \leq x, y' \leq y} i(x', y') \qquad (2)$$

The integral image can be determined by the repetition of the following:

$$s(x,y)=s(x,y-1)+i(x,y),$$

$$ii(x,y)=ii(x-1,y)+s(x,y) \qquad (3)$$

where s(x, y) is the total sum of the pixels in a row, s(x,−1)=0, and ii(−1, y)=0. What is important is that the integral image can be determined through the only one pass scanning over the image.

Figure 7:
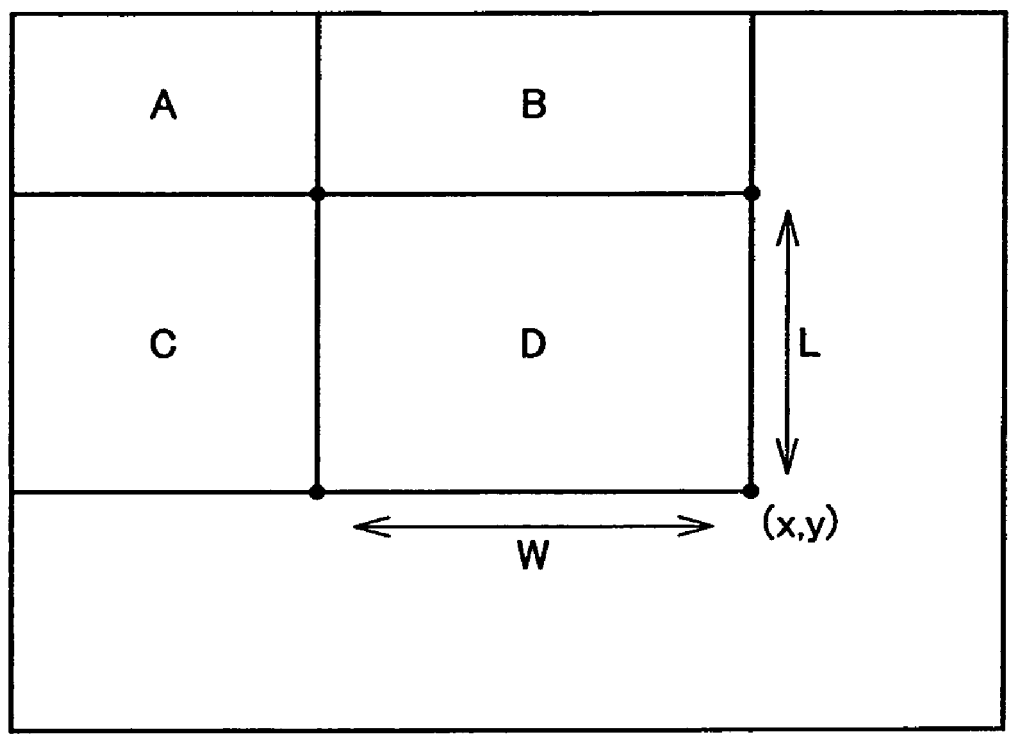
FIG. 7 shows a rectangular region where an integral image is used to determine the total sum.

Using the integral image, the total sum of the brightness value of pixels in a rectangle region can easily be determined. FIG. 7 shows a rectangle region for which total sum is determined using such an integral image.

Using the integral image, the total sum Sr of the brightness of the pixels in the frame of rectangle D shown in FIG. 7 can be determined by calculating the values of four points as follows:

$$S_r=(ii(x,y)+ii(x-W,y-L))-(ii(x-W,y)+ii(x,y-L)) \qquad (4)$$

As above, by using the integral image, the total sum of the brightness value of the pixels in the rectangular region, and the average of the brightness value of the pixels can be determined faster, which enables to carry out processes for the six-segmented rectangular filter faster.

Extraction Process of Between-the-Eyes Candidate Point

In the following, a process of extracting Between-the-Eyes candidate point using the above-mentioned six-segmented rectangular filter will be described.

Figure 8:
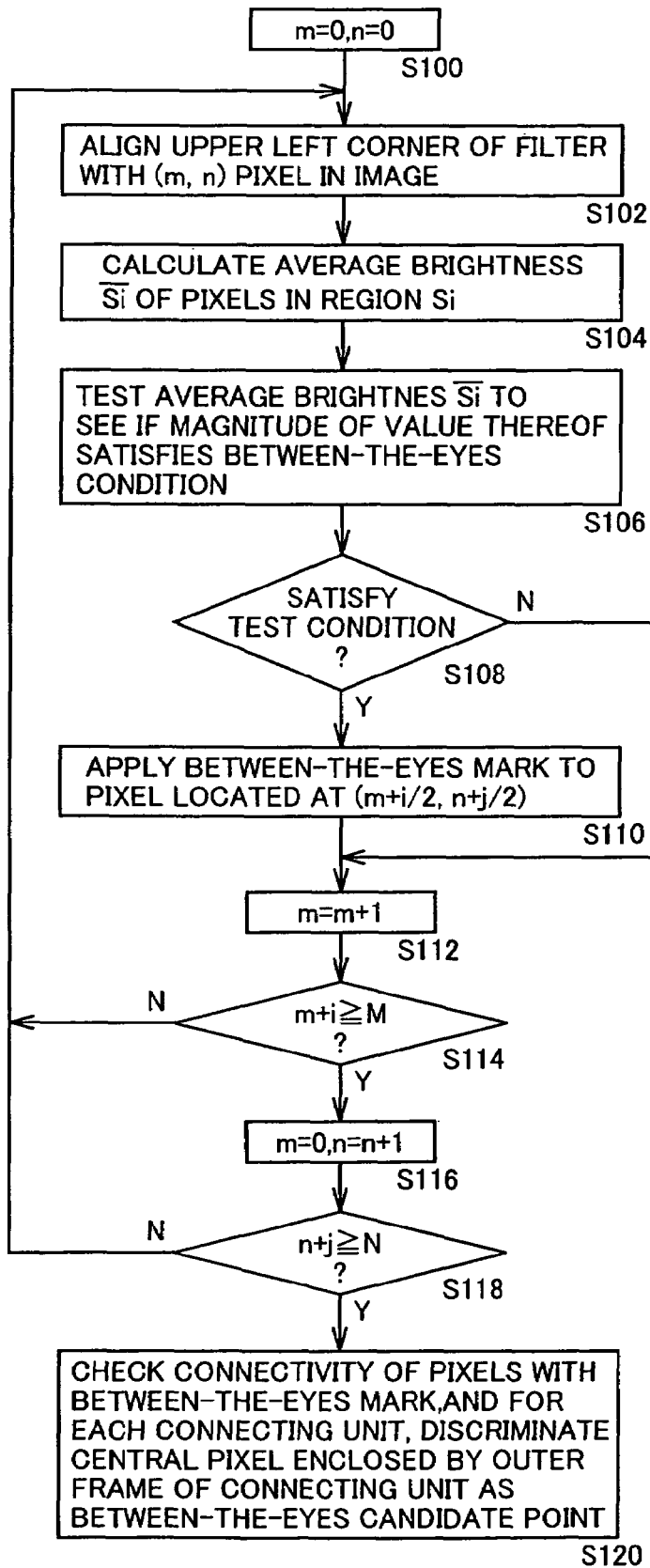
FIG. 8 is a flow chart for describing the process of extracting a Between-the-Eyes candidate point.

FIG. 8 is a flow chart for describing the extraction process of Between-the-Eyes candidate point.

Referring to FIG. 8, as an initialization process, the values of variables m and n are set to m=0, n=0 (step S100).

Subsequently, the upper left corner of the six-segmented rectangular filter is aligned with pixel (m, n) in the image (step S102). Further, average brightness bar Si of the pixels in block Si is calculated (step S104).

Next, average brightness bar Si is tested to see if the magnitude thereof satisfies the Between-the-Eyes candidate condition of expression (1) (step S106).

When it satisfies the test condition (step S108), then a Between-the-Eyes candidate mark is applied to the pixel at a position (m+i/2, n+j/2) that corresponds to the central point of the filter (step S110). On he other hand, when it does not satisfy the test condition (step S108), the process goes to step S112.

At step S112, the value of variable m is incremented by 1. Next, it is determined if the value of variable m is in a range in which the filter can be shifted in the width direction in the object image (step S114). When it is in the range in which the filter can be shifted, the process goes back to step S102. When the filter is at the limit of width direction shift, then the value of variable m is reset to 0 and the value of variable n is incremented by 1 (step S116).

Next, it is determined if the value of variable n is in a range in which the filter can be shifted in the height direction in the object image (step S118). When it is in the range in which the filter can be shifted, then the process goes back to step S102. When the filter is at the limit of height direction shift, then the connectivity of pixels with Between-the-Eyes candidate mark is checked, and for each connecting unit, the central pixel relative to the surrounding outer frame of the connecting unit is determined to be the Between-the-Eyes candidate point (step S120). Here, though the "central pixel" is not specifically limited, but it may be the barycenter of each connecting unit, for example.

Figure 9A:
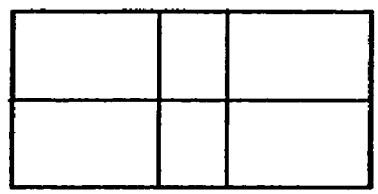
FIGS. 9A and 9B shows the extraction result of Between-the-Eyes candidate point.
Figure 9B:
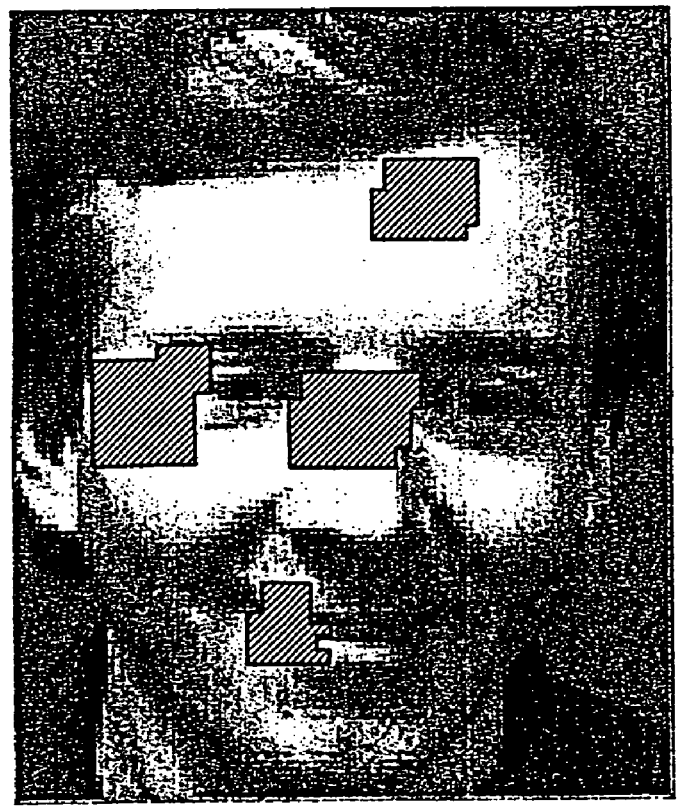

FIGS. 9A and 9B show a result of extracting the Between-the-Eyes candidate point through the process described above. FIG. 9A shows the shape and the size of the applied six-segmented rectangular filter, while FIG. 9B shows the connecting unit with the Between-the-Eyes mark as a hatched region.

As to the selection of size of the six-segmented rectangular filter to be applied for a given object image, for example, when the size of the face image in the object image is known in advance, the size of the filter may be set to that size. Alternatively, the six-segmented rectangular filters of several sizes corresponding to possible sizes of the face of a person standing in a range (a distance from camera 30) to be imaged may be prepared in advance, such that at the first stage of detecting the face, the six-segmented rectangular filters of the different sizes are selectively applied sequentially, to find the one achieving the best adaptation to face detection as described below.

Extraction of Eye Candidate Point and Extraction of True Between-the-Eyes Candidate Point The Between-the-Eyes candidate point extracted as above includes not only a true Between-the-Eyes candidate point but also a false Between-the-Eyes candidate point. Accordingly, a true Between-the-Eyes candidate point is extracted through the following procedure.

First, based on the information of Between-the-Eyes candidate point, a candidate point for an eye position is extracted.

Figure 10:
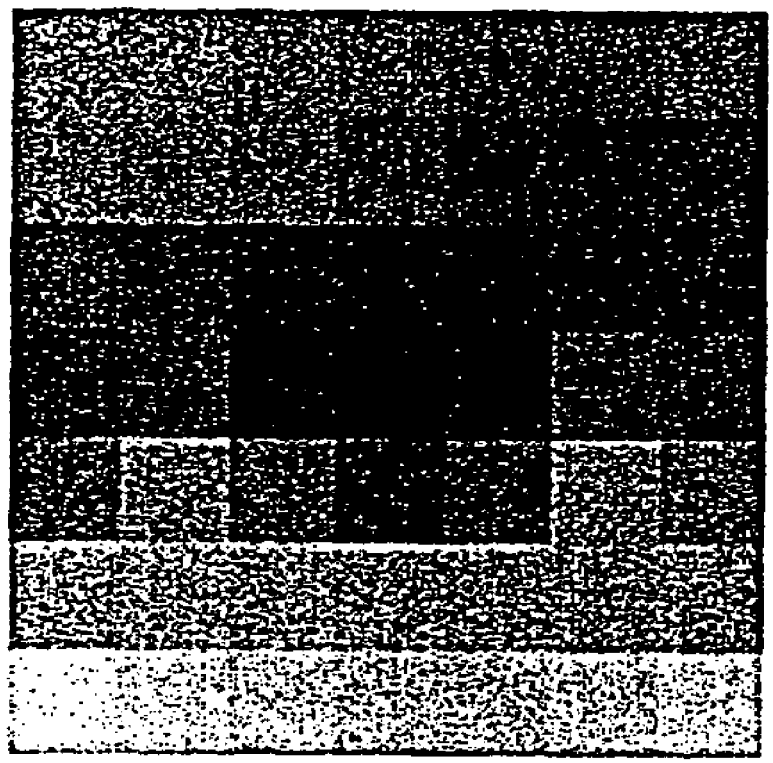
FIG. 10 shows a template of the right eye.

To this end, a plurality of eye images are extracted from a face image database, and an averaged image thereof is obtained. FIG. 10 shows a template for the right eye thus obtained. A template for the left eye may be obtained by horizontally flipping the template for the right eye.

Using the templates for the right and left eyes, template matching process may be carried out in blocks S1 and S3 of the six-segmented rectangular filter, of which center is the Between-the-Eyes candidate point shown in FIG. 3. Then, a candidate point can be extracted for each of the right and left eyes.

Figure 11:
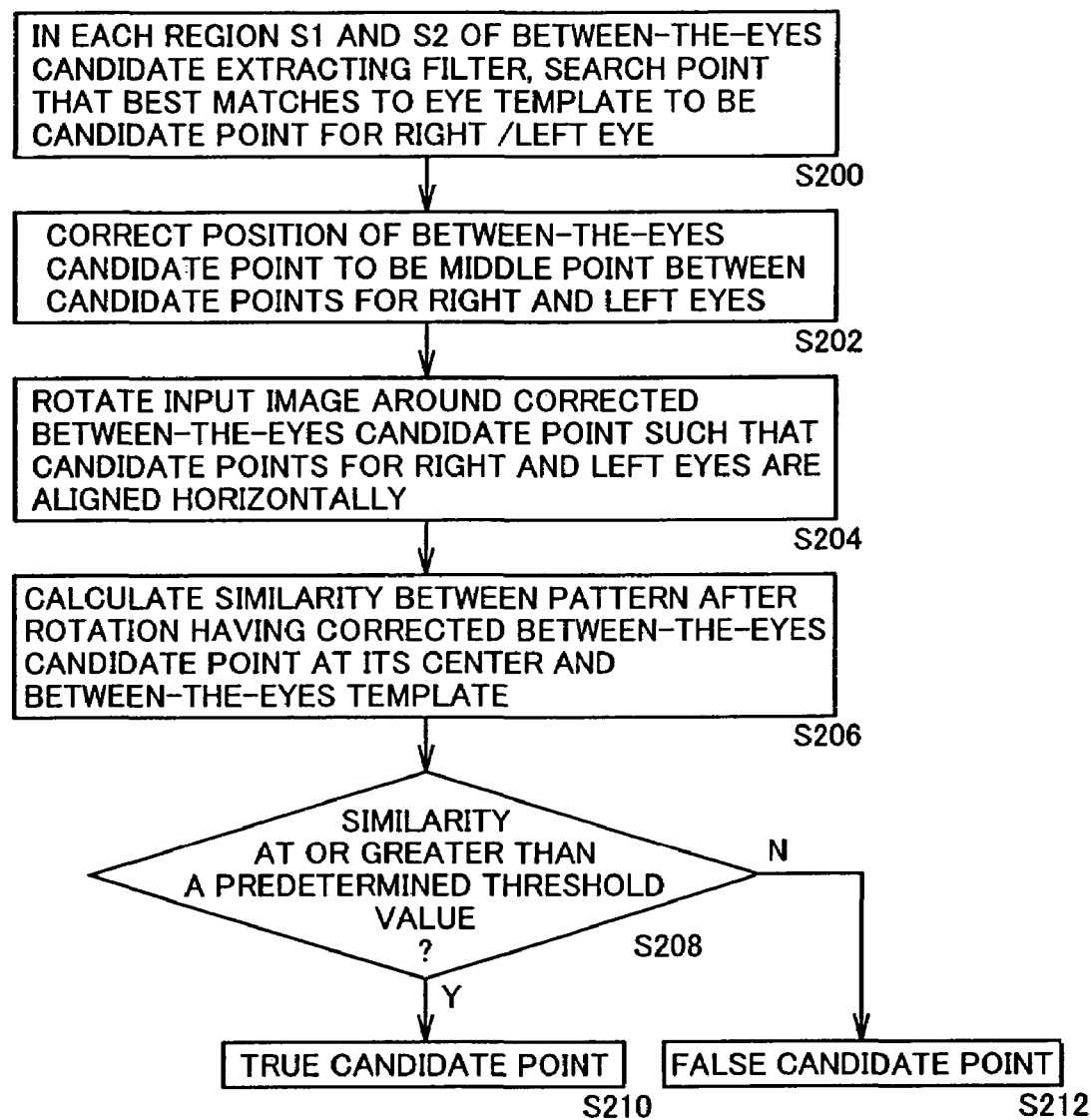
FIG. 11 is a flow chart for describing the process of extracting candidate points of the eyes and then extracting a true Between-the-Eyes candidate point.

FIG. 11 is a flow chart for describing a process of extracting a true Between-the-Eyes candidate point after such extraction of the eye candidate point is performed.

Referring to FIG. 11, first, in each of blocks S1 and S3 of the Between-the-Eyes candidate extracting filter, a point that best matches to the eye template is searched to be a candidate point for the right/left eye (step S200).

Next, the position of the Between-the-Eyes candidate point is corrected to be the middle point between the candidate points for the right and the left eyes (step S202). Subsequently, the input image is rotated around the corrected Between-the-Eyes candidate point such that the candidate points for the right and the left eyes are aligned horizontally (step S204).

The similarity is calculated between the rotated pattern, of which center is the corrected Between-the-Eyes candidate point, and the Between-the-Eyes template that is formed in advance through the procedure described below (step S206).

Then, it is determined if the similarity is at least at the predetermined threshold value (step S208), and when it is, then the Between-the-Eyes candidate point is determined to be a true Between-the-Eyes candidate point (Step S210). When it is not, then the Between-the-Eyes candidate point is determined to be a false Between-the-Eyes candidate point (step S212).

The process above is carried out for every Between-the-Eyes candidate point.

Figure 12:
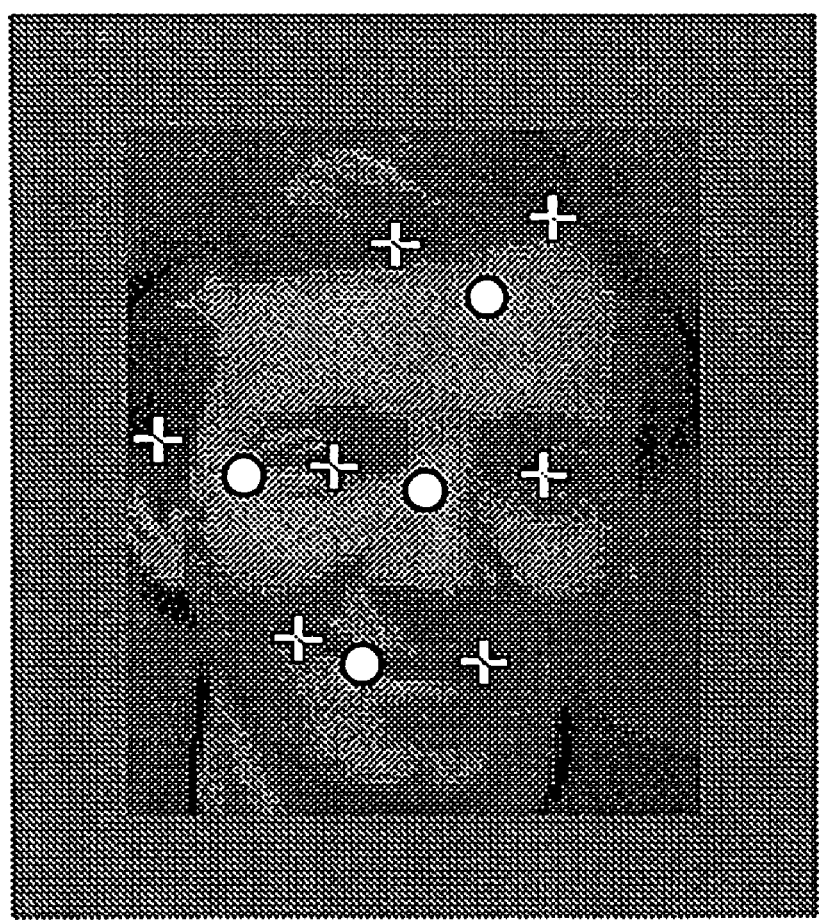
FIG. 12 is an illustration for describing extraction process of the candidate points of the eyes at step S200 in FIG. 11.

FIG. 12 is for describing the process of extracting eye candidate at step S200 in FIG. 11.

In FIG. 12, the white circles indicate the Between-the-Eyes candidate points before correction, and the white crosses indicate the eye candidate points.

Between-the-Eyes Template

Next, the formation method of the Between-the-Eyes template used at step S206 of FIG. 11 will be described.

Figure 13:
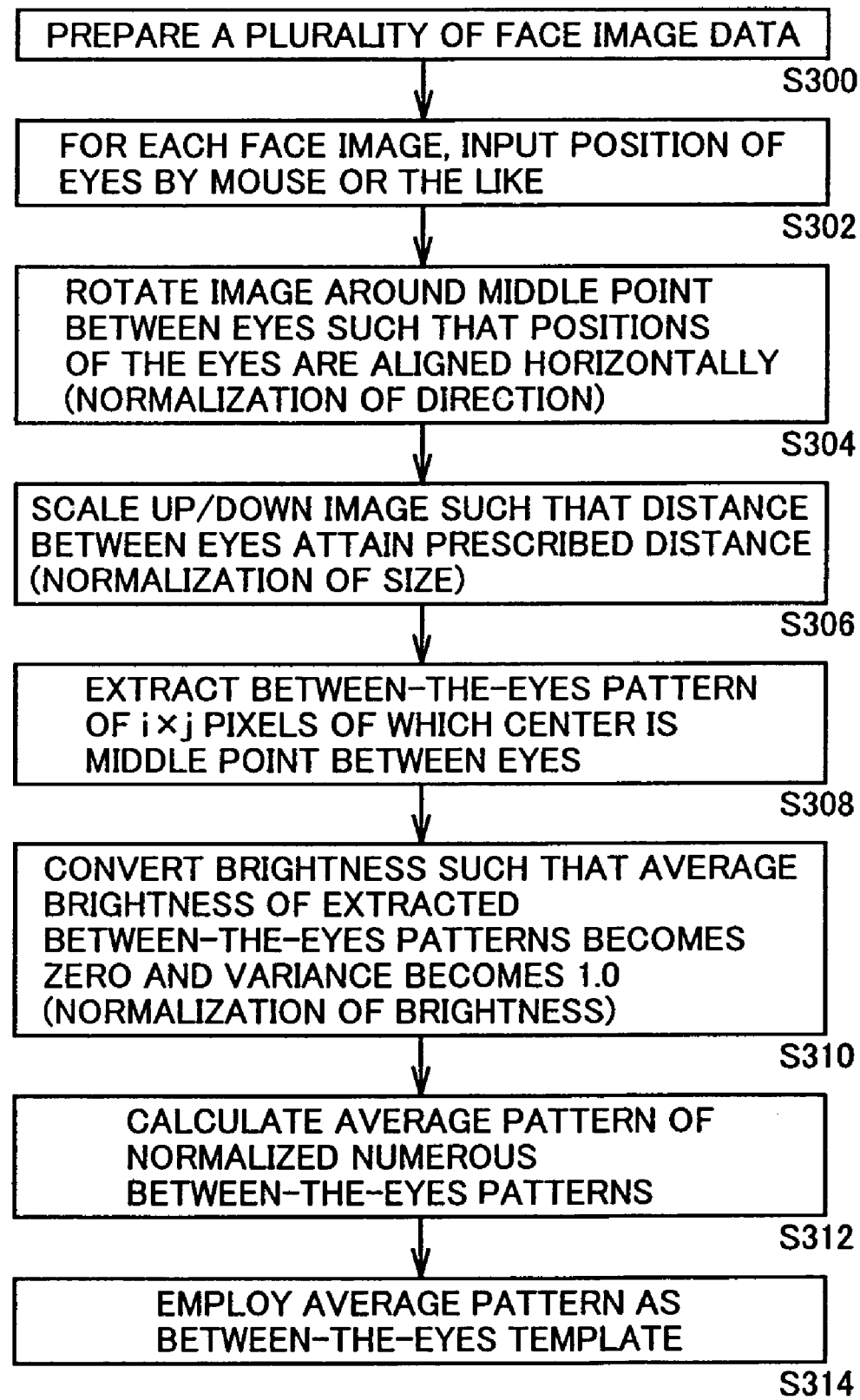
FIG. 13 is a flow chart for describing the procedure of forming a Between-the-Eyes template.

FIG. 13 is a flow chart for describing the formation procedure of the Between-the-Eyes template.

Referring to FIG. 13, a plurality of face image data is prepared (step S300). Subsequently, for each face image, an operator inputs the positions of the both eyes using a mouse or the like (step S302).

Then, as processes handled in the computer, the direction is normalized by rotating the image around the middle point between the eyes, such that the positions of the eyes are aligned horizontally (step S304). Then, the size is normalized by scaling up or down the image such that the eyes are set to have a prescribed distance between them (step S306). Next, the Between-the-Eyes pattern of i×j pixels of which center is the middle point between the eyes is extracted (step S308).

Further, the brightness is normalized by changing the brightness such that the average brightness of the extracted Between-the-Eyes pattern attains a prescribed value, for example zero, and the variance attains other prescribed value, for example 1.0 (step S310).

The average pattern of the numerous normalized Between-the-Eyes patterns is calculated (step S312), and thus obtained average pattern is employed as the Between-the-Eyes template (step S314).

In the present invention, however, the Between-the-Eyes template thus obtained at step S314 is further processed as below.

Specifically, in case of a person with the hair covering down to the eyebrows, the forehead shows low brightness value, while the average template shows high brightness value. The matching evaluation with such a state will result in low matching. Hence, in order not to be affected by the hairstyle, a prescribed number of pixels from the top, for example three pixels, which correspond to the forehead, are not evaluated. For example, if the Between-the-Eyes template obtained at step S314 is a pattern of 32×16 pixels, then ultimately a pattern of 32×13 pixels is used for the template matching.

Figure 14A:
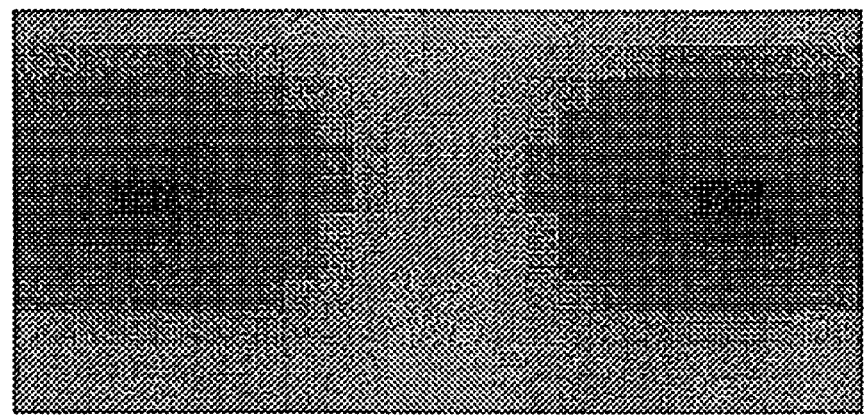
FIGS. 14A and 14B are illustrations for describing the Between-the-Eyes template.
Figure 14B:
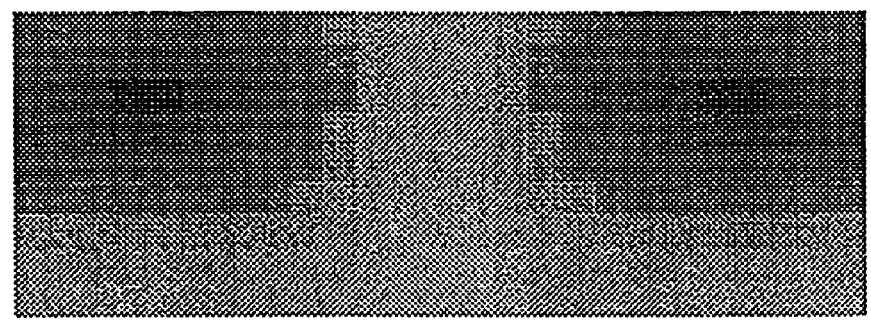

FIGS. 14A and 14B are for describing the Between-the-Eyes template.

FIG. 14A shows the Between-the-Eyes template obtained at step S314 of FIG. 13, while FIG. 14B shows the ultimate Between-the-Eyes template for eliminating the effect of the forehead.

It should be noted that the template matching can be carried out independently for the right and left sides, considering that the lighting may be different depending on the direction of the face. In this case, the Between-the-Eyes template described above may be divided into two, i.e., left and right patterns, to be used for template matching independently. For example, if the Between-the-Eyes template is in the size described above, the right and left patterns each having 16×13 pixels may be employed for the template matching.

Next, the process of template matching at step S206 in FIG. 11 is described in further detail.

Figure 15:
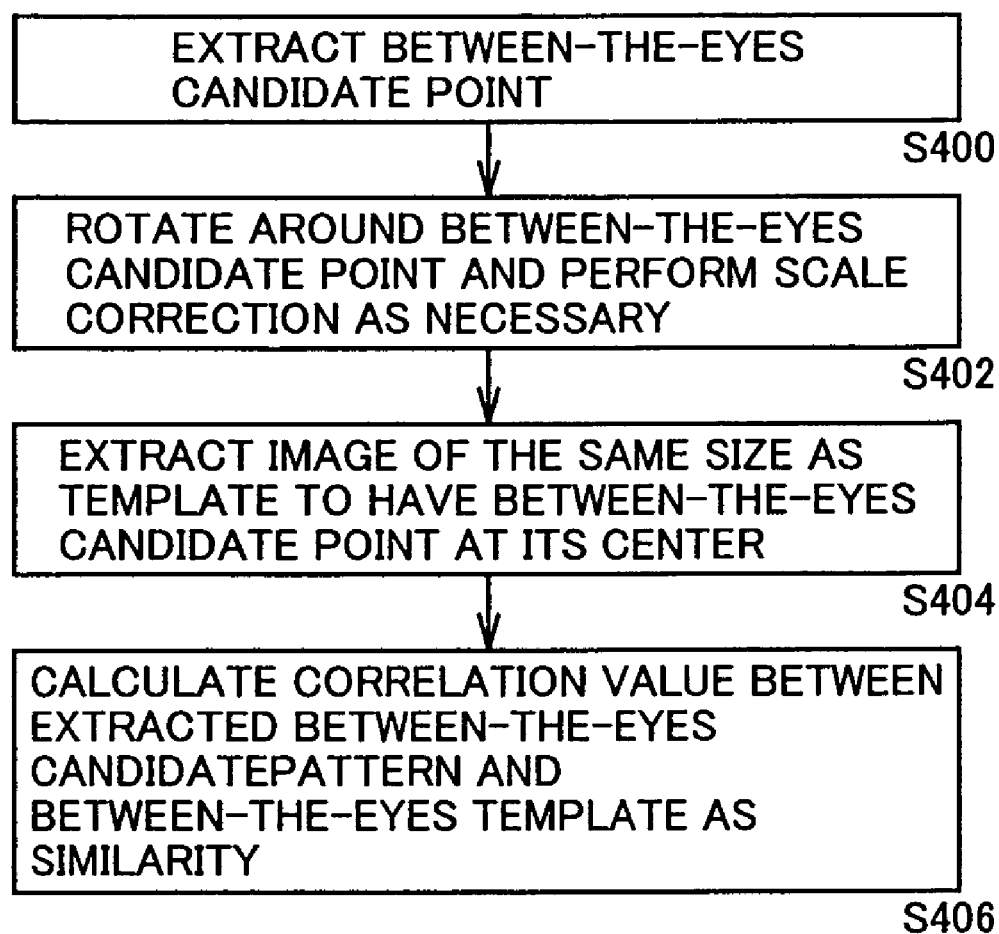
FIG. 15 is a flow chart for describing the procedure of template matching at step S206.

FIG. 15 is a flow chart for describing the procedure of the template matching at step S206.

Referring to FIG. 15, first the Between-the-Eyes candidate point is extracted (step S400), and rotation is carried out around the Between-the-Eyes candidate point and the scale correction is performed as necessary (Step S402).

Next, an image of the same size as the template is extracted, with the Between-the-Eyes candidate point positioned at its center (step S404). Correlation value between thus extracted Between-the-Eyes candidate pattern and the Between-the-Eyes template is calculated as similarity (step S406).

As for the calculation of the similarity, it is also possible to normalize the brightness of the extracted Between-the-Eyes candidate pattern (average zero, variance 1.0), calculate the square of the difference between each pixel and the corresponding pixel of the template, and determine the total sum thereof. Specifically, in this case since the value of the total sum can be regarded as dissimilarity, the similarity can be evaluated by the reciprocal of the dissimilarity.

Figure 16:
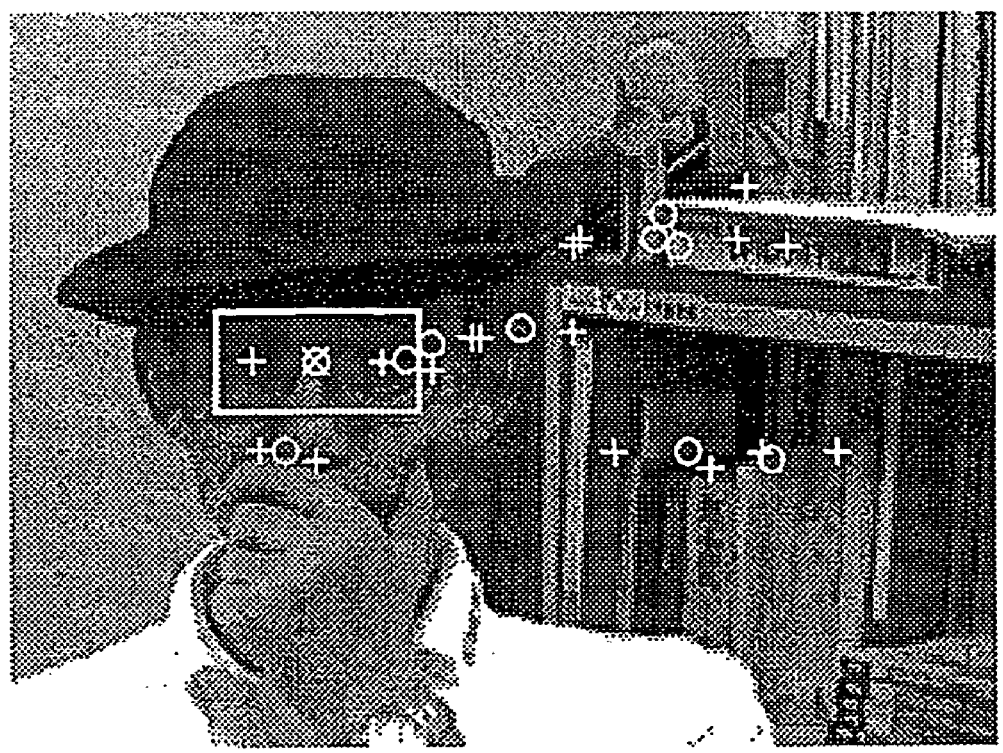
FIG. 16 shows an example of extracting the positions of Between-the-Eyes and the eyes from the object image.

FIG. 16 shows an example where the positions of Between-the-Eyes and the eyes are extracted from the object image as described above.

The position of Between-the-Eyes (the center of the rectangular frame in the figure) and the eyes (crosses) are well detected, in spite of the state of the person wearing a cap and covering the mouse with the hand.

According to the present invention of the first embodiment, by means of the six-segmented rectangular filter and using the brightness information, the Between-the-Eyes candidate point is extracted first, and ultimately the position of the eyes are specified. Thus, the extraction of the face position withstanding the variation in the illumination condition and fast-speed can be achieved.

Further, by performing the above described process of each frame of a video image being imaged, the face image in moving image can be tracked.

In this case, based on the information of the previous frame where the face image has already been detected, it is possible to limit the target region of the filtering process in the current frame.

In the foregoing, it is assumed that the six-segmented rectangular filter is employed as the filter for searching for the Between-the-Eyes candidate point, in which a rectangle is divided into six segments by 3×2.

It should be noted, however, in order to address the face image that is inclined from the horizontal level, the shape of the filter is not limited to those shown in FIGS. 3 and 5.

Figure 17:
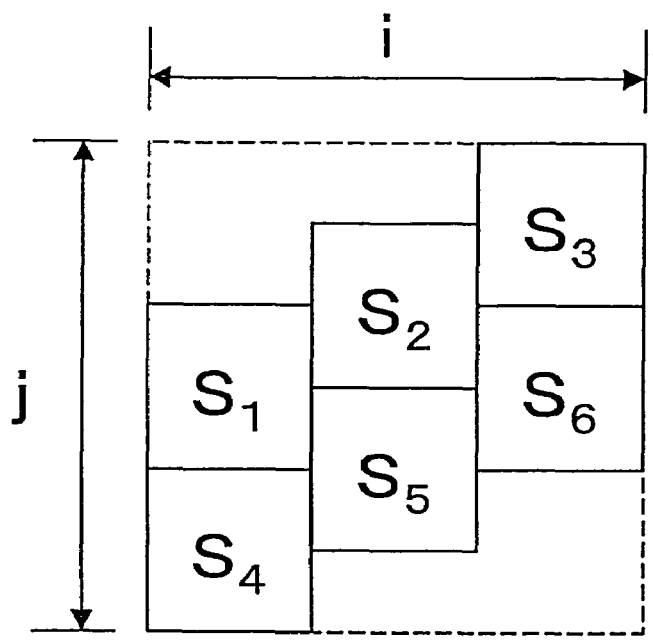
FIG. 17 is a first illustration for describing other shape of the Between-the-Eyes detecting filter.
Figure 18:
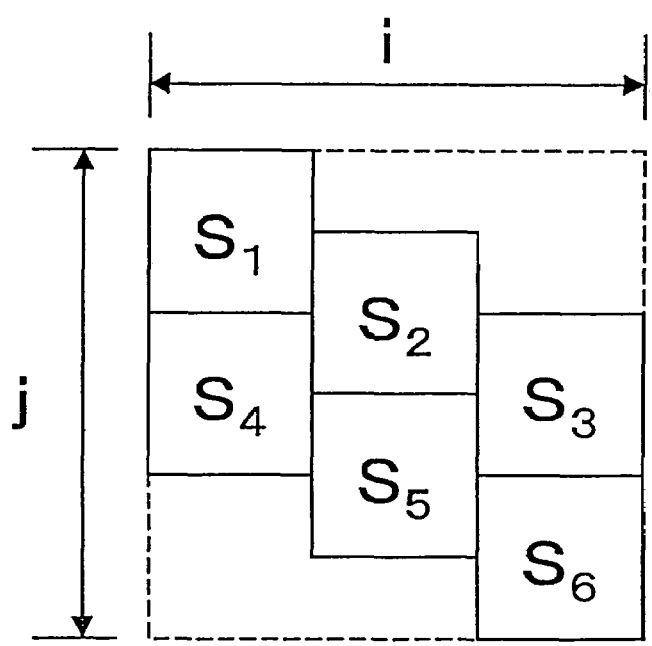
FIG. 18 is a second illustration for describing other shape of the Between-the-Eyes detecting filter.

FIGS. 17 and 18 are illustrations for describing other shapes of such a filter.

Specifically, as shown in FIGS. 17 and 18, relative to the blocks S2 and S5 as in FIG. 1, blocks S1, S4 and blocks S3, S5 can be displaced in opposite directions upwardly and downwardly by a prescribed amount.

In this case, the Between-the-Eyes candidate point can be well detected even when the face image is inclined by the angle corresponding to the displaced amount.

In the present specification, the filters such as shown in FIGS. 3 and 5 (the six-segmented rectangular filter) and the filters such as shown in FIGS. 17 and 18 are generally referred to as the "Between-the-Eyes detecting filters".

Second Embodiment

As described in the first embodiment referring to FIG. 11, when extracting a true candidate point among the Between-the-Eyes candidate points, generally correction of the position of the Between-the-Eyes candidate point, rotation of the input image and the like are required. It is noted, however, when the motion of a person in an image is relatively small, such as in a TV conference, the true candidate point extraction process can be simplified.

Figure 19:
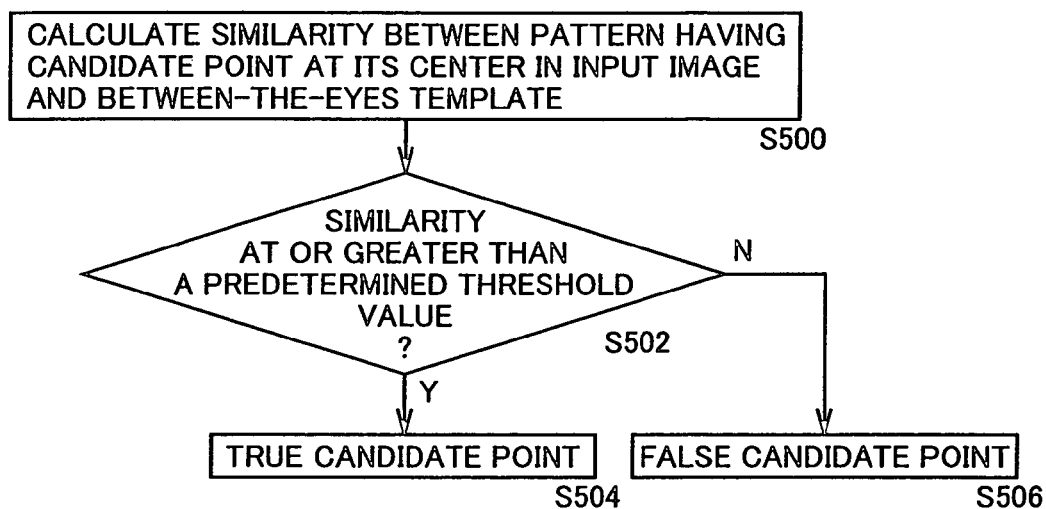
FIG. 19 is a flow chart for describing the process of extracting a true Between-the-Eyes candidate point in a face position extracting apparatus according to a second embodiment.

FIG. 19 is a flow chart for describing the process of extracting the true Between-the-Eyes candidate point in a face position extracting apparatus according to the second embodiment.

Referring to FIG. 19, first, similarity is calculated between the pattern of which center is a Between-the-Eyes candidate point in an input image and a Between-the-Eyes template that is formed in advance (step S500).

Then, it is determined if the similarity is at least at the predetermined threshold value (step S502), and when it is at least at the threshold value, then it is determined to be a true Between-the-Eyes candidate point (step S504). When it is less than the threshold value, then it is determined to be a false Between-the-Eyes candidate point (step S506).

Such a process is carried out for every Between-the-Eyes candidate point.

Other processes and configuration are the same as those of the face position extracting apparatus according to the first embodiment, and therefore description thereof is not repeated.

This configuration also enables to attain the same effect as that of the first embodiment, when the change in the position of a person relative to camera 30 or in the direction of the face is small.

Third Embodiment

In the first and second embodiments, the imaging has been performed with one camera 30.

When two cameras 30, for example, are employed to form binocular stereo configuration, information of the distance to the person can also be obtained.

Specifically, the scheme for extracting a true face candidate point among the candidate points extracted by the six-segmented rectangular filter can similarly be employed in the third embodiment, in principle, with the same method as in the first and the second embodiments.

In a face position extracting apparatus according to the third embodiment, in order to increase the detectable range of the face size, camera 30 is arranged in the binocular stereo configuration, and the size for extracting a face candidate region is switched in accordance with the distance information.

By switching the size for extracting the face candidate region, matching can be carried out by scaling to the size of the average face template, to increase the detecting range of the face.

In the third embodiment, as described above, the binocular stereo configuration is employed to determine parallax information of the candidate point. As the size of the face is considered to be inversely proportional to parallax, the size for extracting the candidate region is determined by the parallax information. Accordingly, the face candidate region can be extracted in the optimum size for matching with the template.

Now, in the following, description will be provided along with evaluation for a face image database that stores images of 40 people, ten each, i.e., total of 400 images with slightly varied facial expressions and under slightly varied lighting conditions.

The face images in the database are monochrome images in the size of 92×112. The size of the rectangle is determined based on the number of pixels, i.e., the width is based on the number of pixels between left and right temples, and the height is based on the number of pixels between eyebrows and top of the nose. Based on manual measurement, for the face image (92×112), the reference rectangle size of 60×30 is employed.

First, FIG. 20 shows in which range the Between-the-Eyes candidate points can be detected for the same face image with six-segmented rectangular filters of different sizes.

Referring to FIG. 20, Between-the-Eyes extraction process is performed by varying the rectangle size by 20% from the reference size. In the experiment, the rate of extracting true candidate point and the number of candidate points were checked. Whether the true candidate point is included in the candidate points were discriminated by visually recognizing if there is a candidate point in the vicinity of the Between-the-Eyes.

According to FIG. 20, the extraction rate using the reference rectangle size (60×30) was 92.0%, which indicates its effective work. On the other hand, the rectangle size of 84×42 resulted in very poor extraction rate, and it is considered that the rectangle is too large to extract the face feature.

Referring to FIG. 20, it is recognized that the extraction of Between-the-Eyes candidate point can be achieved with the rectangle of the size 0.6-1.2 times larger than the reference rectangle. The size of the face and that of rectangle are considered to be in a simple proportional relationship. Accordingly, the rectangle filter is considered to be capable of extracting the Between-the-Eyes candidate point from the face 0.83-1.67 times larger than the reference face size.

Next, in order to determine the relationship between the distance to a person and the size of the face candidate region to be extracted, the face of the person is imaged with the camera configuration used in the face position extracting apparatus, and varying the distance between the person and the camera, parallax of the Between-the-Eyes position and the optimum size for extracting the face is measured.

For example, parallax is obtained by manually measuring the difference between right and left cameras 30 in the number of pixels in the width direction at the position of the Between-the-Eyes of the person. The size for extracting the face is obtained by manually measuring the number of pixels between the left and the right temples. Though it is not specifically limited, the height of the six-segmented rectangular filter may be determined to be half of the width.

Figure 21:
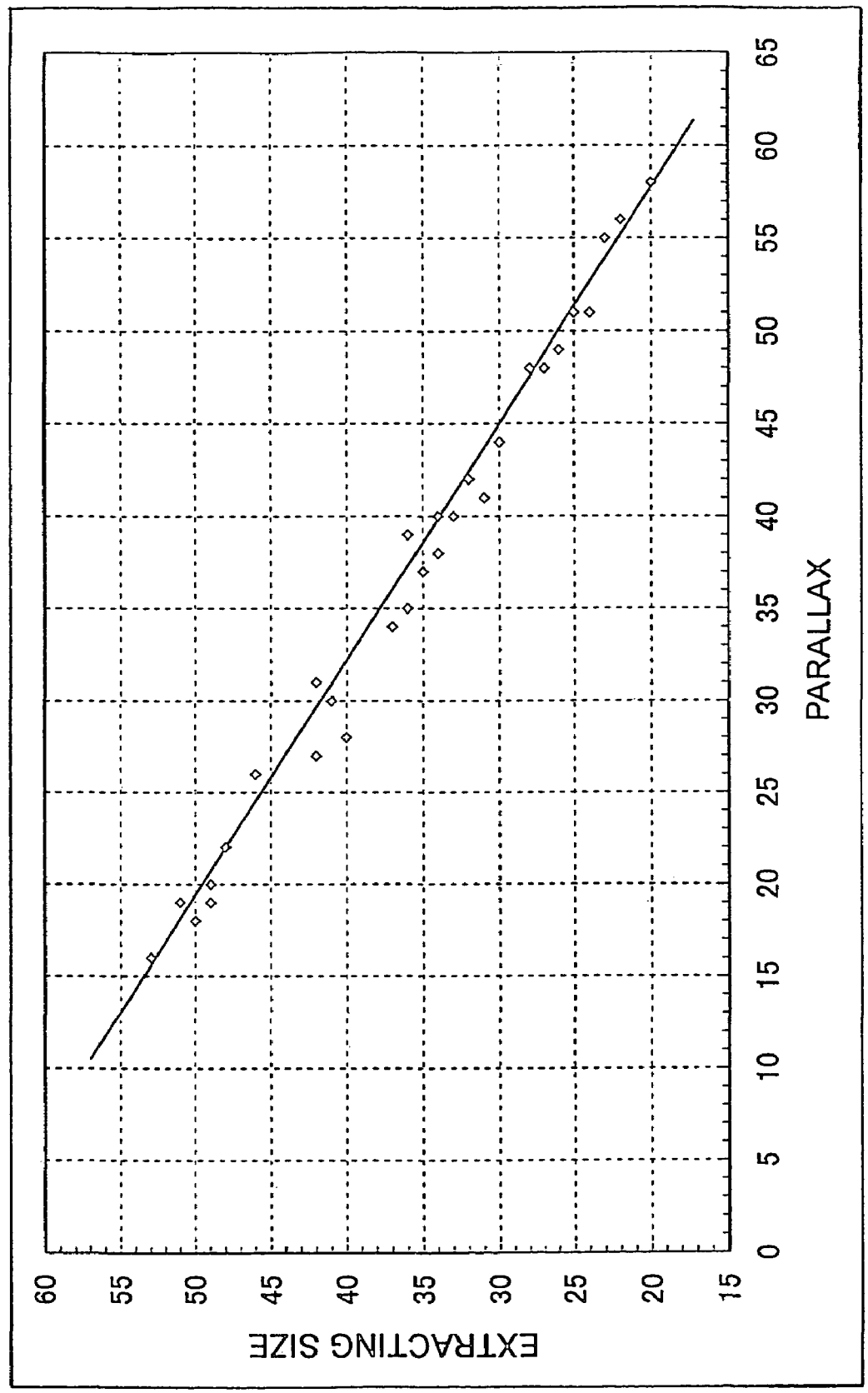
FIG. 21 shows the relationship between parallax and the optimum size for extracting the face.

FIG. 21 shows the relationship between parallax and the optimum size for extracting the face.

Based on FIG. 21, the relationship among the size of six-segmented rectangular filter, parallax and the size for extracting the candidate region is determined.

FIG. 22 shows the relationship among the size of six-segmented rectangular filter, parallax and the size for extracting the candidate region being set based on FIG. 21. Utilizing the fact that the size for extracting the face candidate region that can be extracted with a six-segmented rectangular filter of a certain size may range 0.83-1.67 folds of the reference size, the filter sizes of two types, for example 40×20 and 24×12, were set to cover the entire desired region. The size for extracting the face candidate region was set to be switched by parallax of 5 pixels. Though the smaller steps for extracting the face candidate region may provide higher precision, the matching process of the average face template is flexible to a certain degree of size and therefore the switching of such an extent is enough. In FIG. 22, for example, if parallax is 20 based on the stereo matching when the rectangle filter size is 40×20, then the candidate region is extracted by the size of 48×24.

If there is parallax that does not apply to this table, or no matching is found, then the candidate point is discarded as a false candidate point.

Through the process above, the Between-the-Eyes candidate point can be extracted from the object image with the face position extracting apparatus according to the third embodiment.

Figure 23:
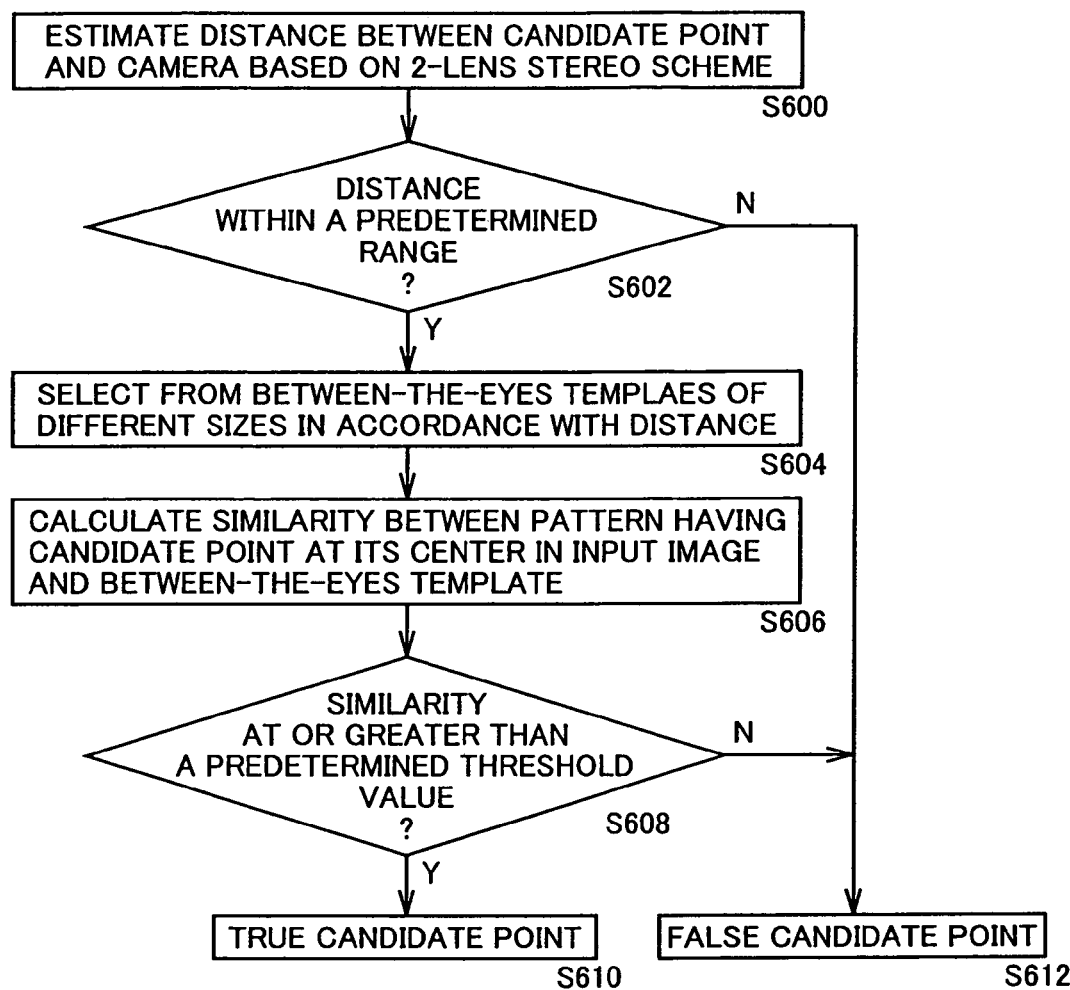
FIG. 23 is a flow chart for describing the process of extracting a true Between-the-Eyes candidate point in a face position extracting apparatus according to a third embodiment.

FIG. 23 is a flow chart for describing the process of extracting a true Between-the-Eyes candidate point with the face position extracting apparatus according to the third embodiment.

Referring to FIG. 23, the distance of the candidate point from camera 30 is estimated by binocular stereo scheme (step S600).

Then, it is determined if the distance is within a predetermined range (step S602). If it is not, then the candidate point is determined to be false (step S612).

On the other hand, if the distance is within a predetermined range, then select one from Between-the-Eyes templates of different sizes that have been prepared in advance, in accordance with the distance (step S604).

Then, the similarity between the pattern of which center is at the Between-the-Eyes candidate point in an input image and the selected Between-the-Eyes template is calculated (step S606).

Then, it is determined if the similarity is at least at the predetermined threshold value (step S608), and if it is, then the Between-the-Eyes candidate point is determined to be true (step S610). On the other hand, when the similarity is less than the threshold value, then the Between-the-Eyes candidate point is determined to be false (step S612).

Such a process is carried out for every Between-the-Eyes candidate point.

Other processes and configuration are similar to those of the face position extracting apparatus according to the first embodiment, and therefore description thereof is not repeated.

With such a configuration, the extraction of the true candidate point is performed taking into account of the distance between the person and camera 30, and therefore the position detection of the face image can be carried out faster. Accordingly, by performing the process of the third embodiment to each frame of the moving image, the face image can be tracked.

It is noted that, according to the third embodiment also, as described in the first embodiment with reference to FIG. 11, it is possible to perform correction of the position of the Between-the-Eyes candidate point and rotation of the input image after detecting the position of the eyes, when extracting the true candidate point among the Between-the-Eyes candidate points.

Fourth Embodiment

In the third embodiment, one of the Between-the-Eyes templates of different sizes prepared in advance is selected, in accordance with the distance between the Between-the-Eyes candidate point and camera 30.

It should be noted that the template matching can be carried out by scaling down (or up) the input image in accordance with the distance between the Between-the-Eyes candidate point and camera 30, so that it conforms to the size of the reference Between-the-Eyes template.

Figure 24:
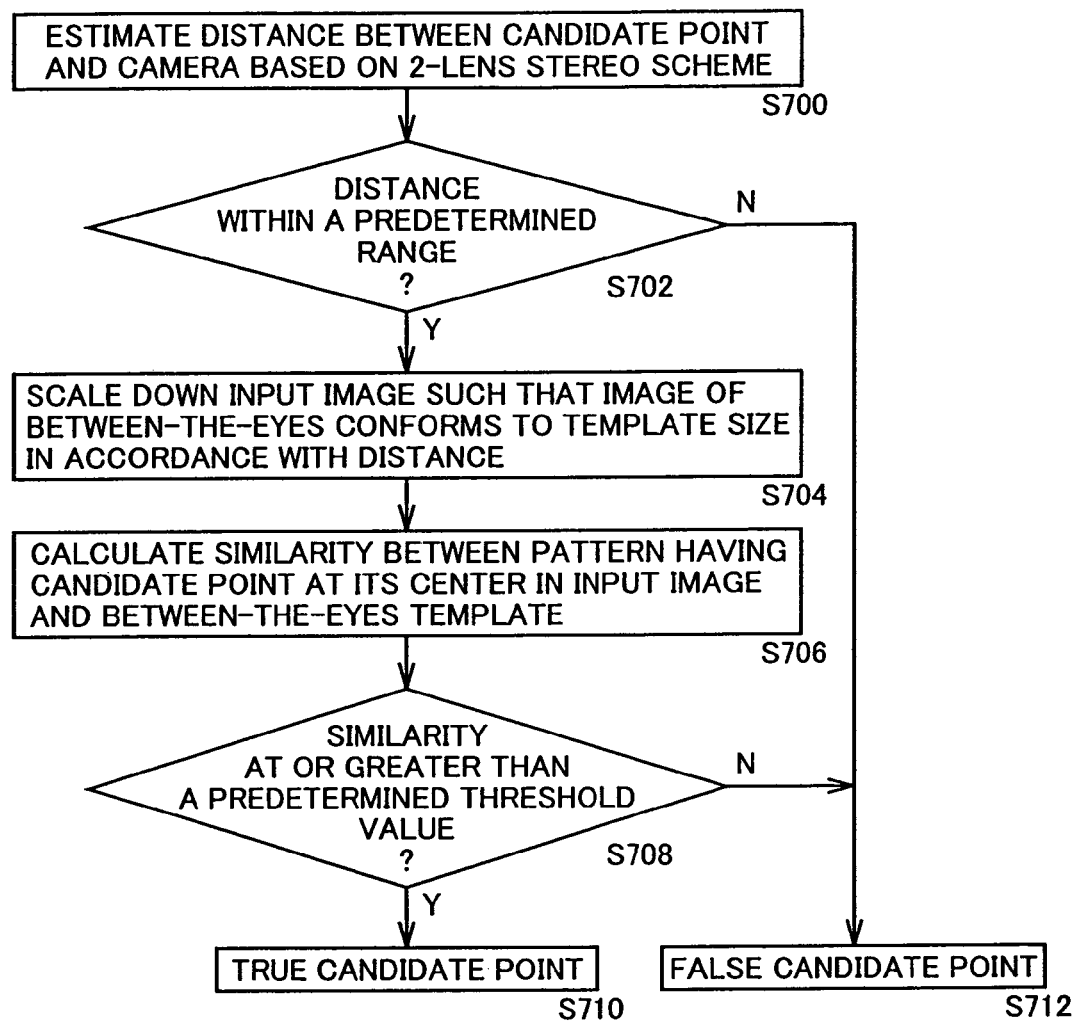
FIG. 24 is a flow chart for describing the process of extracting a true Between-the-Eyes candidate point in a face position extracting apparatus according to a fourth embodiment.

FIG. 24 is a flow chart for describing a process of extracting a true Between-the-Eyes candidate point with a face position extracting apparatus according to the fourth embodiment.

Referring to FIG. 24, the distance between a candidate point and camera 30 is estimated by a binocular stereo scheme (step S700).

Next, it is determined if the distance is within a predetermined range (step S702). If it is not, then the candidate is determined to be false (step S712).

On the other hand, if the distance is within a predetermined range, then the input image is scaled down such that the Between-the-Eyes image conforms to the template size in accordance with the distance (step S704).

The similarity between the scaled pattern of which center is the candidate point in the input image and the Between-the-Eyes template is calculated (step S706).

Then, it is determined if the similarity is at least at a predetermined threshold value (step S708), and when it is, then the candidate is determined to be true (step S710). On the other hand, if it is less than the threshold value, then the candidate is determined to be false (step S712).

Such a process is carried out for every Between-the-Eyes candidate point.

Other processes and configuration are similar to those of the face position extracting apparatus according to the third embodiment, and therefore description thereof is not repeated.

With such a configuration, the extraction of the true candidate point is performed taking into account of the distance between the person and camera 30, and therefore the position detection of the face image can be carried out faster. Accordingly, by performing the process of the fourth embodiment to each frame of the moving image, the face image can be tracked.

It is noted that, according to the fourth embodiment also, as described in the first embodiment with reference to FIG. 11, it is possible to perform correction of the position of the Between-the-Eyes candidate point and rotation of the input image after detecting the position of the eyes, when extracting the true candidate point among the Between-the-Eyes candidate points.

With processes of each of the embodiments described above, the position of the Between-the-Eyes or the eyes can be detected in real time, from screen information that is successive with prescribed intervals for time axis, e.g., successive frame images. Further, by successively performing the detection of the position of the Between-the-Eyes or the eyes for each of such successive screen information, the position of the Between-the-Eyes or the eyes can be tracked.

Variation of Process of Selecting True Between-the-Eyes from Between-the-Eyes Candidate Points In the embodiments above, in the face position extracting process, the process is performed in which Between-the-Eyes candidate points are extracted from an image with a Between-the-Eyes detecting filter and selecting a true Between-the-Eyes candidate point from Between-the-Eyes candidate points.

In other words, the "process of detecting the true Between-the-Eyes candidate point" corresponds to a pattern discriminating process of selecting a candidate point that corresponds to a true Between-the-Eyes from a plurality of Between-the-Eyes candidate points. In the embodiments described above, though the pattern discriminating process has been described to be performed based on "the similarity with the Between-the-Eyes template", the method of pattern identification is not necessarily limited thereto.

In the following, a variation will be described that is possible as such a pattern identification process including the pattern discriminating process based on "the similarity with the Between-the-Eyes template".

(1) Pattern Determining Process Based on the Similarity with Pattern Template

When a template is $f=\{t_{ij}\}$ and a pattern to be evaluated is $f=\{f_{ij}\}$, then total sum of absolute value of the difference between each of corresponding pixel values as expression (5) can be found as a simple similarity evaluation value (q):

$$q=\Sigma|t_{ij}-f_{ij}| \quad (5)$$

Alternatively, sum square of the absolute value of the difference as expression (6) may be used:

$$q=\Sigma(t_{ij}-f_{ij})^2 \quad (6)$$

When expressions (5) and (6) are used, it is determined that lower value indicates higher similarity.

On the other hand, as other evaluation value, normalized correlation value indicated by expression (7) can be used:

$$q = \frac{\sum (t_{ij} - \bar{t})(f_{ij} - \bar{f})}{\sqrt{\sum (t_{ij} - \bar{t})^2} \sqrt{\sum (f_{ij} - \bar{f})^2}} \qquad (7)$$

where $\bar{t}$, $\bar{f}$ are average values of $\{t_{ij}\}$, $\{f_{ij}\}$, respectively.

In expression (7), the value of q is 1 when $\{t_{ij}\}$, $\{f_{ij}\}$ fully match, whereas it is −1 when they are in a fully inverted pattern (the brightness and the darkness are inverted). In other cases, q takes on the value between 1 and −1. When using expression (7), larger q value results in the evaluation that the similarity is higher.

In the normalized correlation value, evaluation is made based on the difference from the average value. Therefore, the evaluation is not affected even when the overall brightness is shifted. Additionally, for example when the illumination is weakened, not only the average value of the brightness but also the contrast lower. In such a case also, the value of q is not effected because of the normalized term of denominator.

Further, as shown by expression (8), an average pattern of many sample patterns $(S^n = \{s^n_{ij}\})$ can be used as a template:

$$t_{ij} = \frac{\sum S^n_{ij}}{N} \qquad (8)$$

In this case, a weighted similarity evaluation can be performed. For example, the right portion above the right eye or the left portion above the left eye of a person may be covered with the hair, while of others may not. Therefore, these particular parts are considered to be less important even when they show difference from templates.

Accordingly, when there are many sample patterns, at first step the variance is calculated that shows the degree of variation in brightness among each pixel positions, as indicated by expression (9):

$$v_{ij} = \frac{\sum (S^n_{ij} - \bar{S}_{ij})^2}{N} \qquad (9)$$

Next, using the reciprocal of the variance for weighting, the weighted similarity evaluation using evaluation value q as indicated in expression (10) can be carried out:

$$q = \sum \frac{(t_{ij} - f_{ij})^2}{v_{ij}} \qquad (10)$$

Alternatively, weighting may be carried out considering covariance that is an index showing the degree of variation in a relationship between pixels, such as "at the position symmetric to the right eye, there should be the left eye of the same color of black" and "between them there should be the nose bridge that is bright". In contrast, expression (9) is the case of autovariance.

Such a similarity weighted considering the covariance is referred to as "Mahalanobis distance".

Specifically, when $t_{ij}$ is aligned in a column to be expressed like a vector, then the Mahalanobis distance q is indicated as expression (11):

$$q = (t-f)^T \Sigma^{-1} (t-f) \qquad (11)$$

where $\Sigma$ is covariance matrix of $S^n$. With Mahalanobis distance q also, the pattern discriminating process based on the similarity with the pattern template can be carried out.

(2) Statistical Pattern Determining Process

The process of extracting Between-the-Eyes candidate points from an image with the Between-the-Eyes detecting filter and then selecting a true Between-the-Eyes from the candidate points can be regarded in other words as a procedure of determining the Between-the-Eyes candidate points whether they correspond to a face pattern or not for extracting a true Between-the-Eyes.

In this case, a statistical pattern discriminating process may be applied for the process of determining "face" and "non-face".

Specifically, the statistical pattern discriminating process is to determine, when many samples of "face" and "non-face" are given, whether an "unknown" pattern is "face" or "non-face" based on that given data. As for the similarity calculation as described above, the concept of "non-face" is not necessary.

(2-1) Linear Determining Method

When pattern $f = \{f_{ij}\}$ is considered as a vector of I×J dimensions where the pixel values of the pattern is aligned in a column, then one pattern can be recognized as one point in I×J dimensional space.

Since it is difficult to illustrate three and higher dimensions on a plane, in the following an example of two dimensions will be described.

Figure 25:
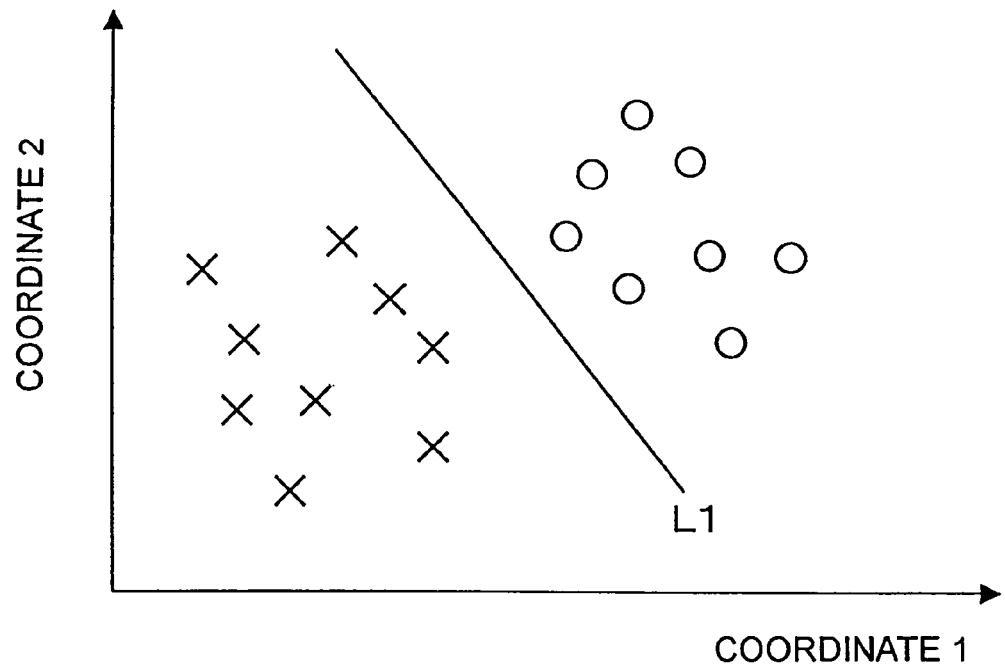
FIG. 25 is a schematic diagram showing an exemplary distribution of "face" samples and "non-face" samples.

FIG. 25 is a conceptual illustration showing an exemplary distribution of "face" samples and "non-face" samples.

As shown in FIG. 25, when samples of "face" (O) and samples of "non-face" (x) are distributed, line L1 separating "face" (O) and "non-face" (x) is determined in advance, so that an "unknown" pattern can be discriminated as "face" (O) or "non-face" (x) by checking on which side of line L1 the input pattern of "unknown" resides.

It is a line ax+by in two dimensions, whereas it is a plane expressed by ax+by+cz in three dimensions. Generally, at higher dimensions it will be a hyperplane expressed by linear combination of each dimensional element. Such a discrimination based on a hyperplane is referred to as a "linear discriminant method".

Generally, though not always one hyperplane fully discriminates "face" (O) and "non-face" (x), the hyperplane is determined in advance such that the total of errors where "non-face" (x) resides at "face" (O) side and errors where "face" (O) resides at "non-face" (x) side becomes minimum.

(2-2) Support Vector Machine

Even when a hyperplane is determined so that the errors will be minimized in the linear discriminant method described above, in practice possibly the errors are unacceptably great.

It is known that, even in such a situation, for example, by mapping a point in a three-dimensional space (x, y, z) to a space of higher dimensions such as $(x^2, y^2, z^2, xy, yz, zx)$ (in this example six dimensions), sometimes "face" (O) and "non-face" (x) as described above may be successfully discriminated by the hyperplane of the space. Further, with a support vector machine, the hyperplane of higher dimensional space to be mapped can be calculated in the original space, without actually mapping the point to the higher dimensional space.

A specific configuration for detecting a face with a support vector machine is disclosed, for example, in the reference: E. Osuna, R. Freund, and F. Girosi, "Training Support Vector Machines: An Application to Face Recognition", Proceedings of IEEE Conference on Computer Vision and Pattern Recognition, pp. 130-136, 1997.

In the following, the overview of a support vector machine is described.

Figure 26:
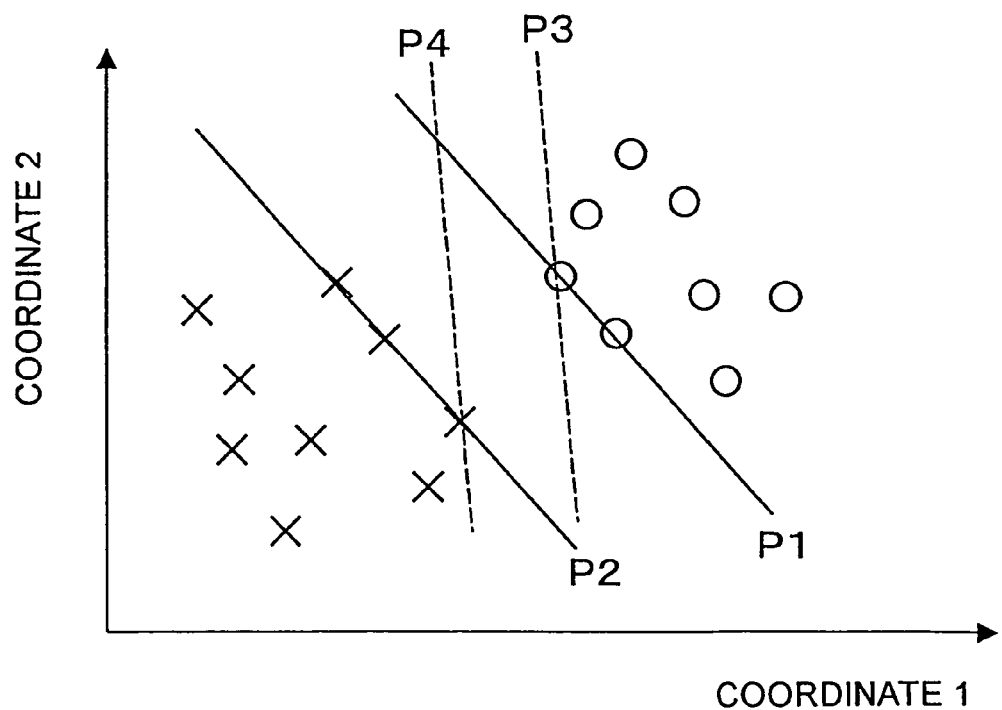
FIG. 26 shows higher dimensional space to which a point is to be mapped where a support vector machine is applied.

FIG. 26 shows higher dimensional space to which a point is to be mapped where a support vector machine is applied.

In FIG. 26 also, the higher dimensional space is illustrated as two-dimensional space.

In the support vector machine, two hyperplanes parallel to each other are assumed. The two hyperplanes form a pair in which one of two hyperplanes is a hyperplane P1 adjacent to samples of "non-face" (in the figure x), and the other is a hyperplane P2 adjacent to samples of "face" (in the figure O).

Other pair of P3 and P4 may be possible. However, in the support vector machine a pair with a greatest interval is employed from possible pairs of hyperplane. This interval is considered to be an margin in discrimination, and the pair with the greatest margin is employed.

The discrimination of "face" pattern and "non-face" pattern based on hyperplanes as shown in FIG. 26 is performed regarding an intermediate hyperplane away from hyperplane P1 and hyperplane P2 by the same distance as a hyperplane for discrimination according to the linear discrimination as described above.

(2-3) Discrimination Based on Bayes Estimation

When there are exclusive events $H_1$ (it is a face) and $H_2$ (it is a non-face) where A is an arbitrary event (brightness/darkness pattern being extracted), Bayesian theory is indicated by the following expression:

$$P(H_1 \mid A) = \frac{P(A \mid H_1)P(H_1)}{P(A \mid H_1)P(H_1) + P(A \mid H_2)P(H_2)} \quad (12)$$

where $P(H_1|A)$ is posterior probability that event A corresponds to event $H_1$ when event A is found to have occurred, and $P(A|H_1)$ is prior probability of the occurrence of event A on the premise of the occurrence of event $H_1$. In Bayes discrimination, after it is known that event A has occurred, each prior probability of being $H_1$ and $H_2$ is compared to employ the pattern with higher probability. The proportion between each posterior probability is indicated by the following expression:

$$\frac{P(H_1 \mid A)}{P(H_2 \mid A)} = \frac{P(A \mid H_1)P(H_1)}{P(A \mid H_2)P(H_2)} \quad (13)$$

When expression (13) is greater than 1, then it is determined to be $H_1$. Expression (13) may be rewritten to be the following expression (14):

$$\frac{P(A \mid H_1)}{P(A \mid H_2)} > \frac{P(H_2)}{P(H_1)} = \lambda \quad (14)$$

Thus, by collecting many samples of events $H_1$ and $H_2$ and estimating $P(A|H_1)$ and $P(A|H_2)$ in advance, and then determining by expression (14) using λ as a threshold parameter, then decision can be made whether event A should be determined as event $H_1$ or $H_2$.

As for the method for detecting a face based on Bayes discrimination method is disclosed, for example, in the reference: H. Schneiderman and T. Kanade, "Probabilistic Modeling of Local Appearance and Spatial Relationships for Object Recognition", Proceedings of IEEE Conference on Computer Vision and Pattern Recognition, pp. 45-51, 1998.

Further, it is possible to perform discrimination process of "face" and "non-face" by a discrimination based on a neural network.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for extracting a face position, comprising the steps of:

preparing digital data of a value of each pixel within an object image region including a region of a human face; and extracting in said object image region a position of a Between-the-Eyes candidate point by scanning and filtering process with a Between-the-Eyes detecting filter in which six rectangles are connected, wherein said Between-the-Eyes detecting filter has a width which is substantially as long as the width of the face, said six rectangles are arranged in two in a horizontal direction x three in a vertical direction, and when Sij ($1 \leq i \leq 2, 1 \leq j \leq 3$) represents an average value of brightness of pixels in each of said rectangles, said scanning and filtering process extracts pixels satisfying the following equations, S11<S12 and S11<S21

S13<S12 and S13<S23: and extracting a portion of said object image in a prescribed size which has the extracted position of said Between-the-Eyes candidate point at a center, and selecting a true candidate point from said Between-the-Eyes candidate points in accordance with a pattern discriminating process.

2. The method for extracting a face position according to claim 1, wherein said Between-the-Eyes detecting filter is one rectangle divided into six segments.

3. The method for extracting a face position according to claim 1, wherein said six rectangles includes two first rectangles adjacent to each other in a vertical direction, two second rectangles displaced relative to said first rectangles by a prescribed amount in said vertical direction, and adjacent to each other in said vertical direction, and two third rectangles displaced relative to said second rectangles by a prescribed amount in said vertical direction, and adjacent to each other in said vertical direction.

4. The method for extracting a face position according to claim 1, wherein said step of selecting a true candidate point includes steps of detecting positions of eyes through a pattern discriminating process with respect to said object image that corresponds to prescribed two rectangles among rectangles forming said Between-the-Eyes detecting filter, correcting the position of said Between-the-Eyes candidate point to a middle point between two eyes based on said detected positions of the eyes, rotating an input image around said corrected position of Between-the-Eyes candidate point such that the two eyes are aligned horizontally, and extracting from said rotated input image a portion of said object image in a prescribed size which has the corrected position of said Between-the-Eyes candidate point at a center, and selecting a true candidate point from said Between-the-Eyes candidate points in accordance with a pattern discriminating process.

5. The method for extracting a face position according to claim 1, wherein said step of preparing digital data includes a step of preparing said object image as a stereo image, and said step of selecting a true candidate point includes a step of selecting a true candidate point from said Between-the-Eyes candidate points in accordance with a distance to said Between-the-Eyes candidate point from an observation point that is detected based on said stereo image.

6. A computer readable medium storing a program for causing a computer to execute a method for extracting a face position within an object image region, said program causing said computer to execute the steps of:

preparing digital data of a value of each pixel within an object image region including a region of a human face; and extracting in said object image region a position of a Between-the-Eyes candidate point by scanning and filtering process with a Between-the-Eyes detecting filter in which six rectangles are connected, wherein said Between-the-Eyes detecting filter has a width which is substantially as long as the width of the face, said six rectangles are arranged in two in a horizontal direction by three in a vertical direction, and when Sij ($1 \leq i \leq 2$, $1 \leq j \leq 3$) represents an average value of brightness of pixels in each of said rectangles, said scanning and filtering process extracts pixels satisfying the following equations, S11<S12 and S11<S21

S13<S12 and S13<S23; and extracting a portion of said object image in a prescribed size which has the extracted position of said Between-the-Eyes candidate point at a center, and selecting a true candidate point from said Between-the-Eyes candidate points in accordance with a pattern discriminating process.

7. The computer readable medium according to claim 6, wherein said Between-the-Eyes detecting filter is one rectangle divided into six segments.

8. The computer readable medium according to claim 6, wherein said six rectangles includes two first rectangles adjacent to each other in a vertical direction, two second rectangles displaced relative to said first rectangles by a prescribed amount in said vertical direction, and adjacent to each other in said vertical direction, and two third rectangles displaced relative to said second rectangles by a prescribed amount in said vertical direction, and adjacent to each other in said vertical direction.

9. The computer readable medium according to claim 6, wherein said step of selecting a true candidate point includes steps of detecting positions of eyes through a pattern discriminating process with respect to said object image that corresponds to prescribed two rectangles among rectangles forming said Between-the-Eyes detecting filter, correcting the position of said Between-the-Eyes candidate point to a middle point between two eyes based on said detected positions of the eyes, rotating an input image around said corrected position of Between-the-Eyes candidate point such that the two eyes are aligned horizontally, and extracting from said rotated input image a portion of said object image in a prescribed size which has the corrected position of said Between-the-Eyes candidate point at a center, and selecting a true candidate point from said Between-the-Eyes candidate points in accordance with a pattern discriminating process.

10. The computer readable medium according to claim 6, wherein said step of preparing digital data includes a step of preparing said object image as a stereo image, and said step of selecting a true candidate point includes a step of selecting a true candidate point from said Between-the-Eyes candidate points in accordance with a distance to said Between-the-Eyes candidate point from an observation point that is detected based on said stereo image.

11. An apparatus for extracting a face position, comprising:

an imaging unit preparing digital data of a value of each pixel within an object image region including a region of a human face; and an extracting unit extracting in said object image region a position of a Between-the-Eyes candidate point by scanning and filtering process with a Between-the-Eyes detecting filter in which six rectangles are connected, wherein said Between-the-Eyes detecting filter has a width which is substantially as long as the width of the face, said six rectangles are arranged in two in a horizontal direction by three in a vertical direction and when Sij ($1 \leq i \leq 2$. $1 \leq j \leq 3$) represents an average value of brightness of pixels in each of said rectangles, said scanning and filtering process extracts pixels satisfying the following equations, S11<S12 and S11<S21

S13<S12 and S13<S23; and a selecting unit extracting a portion of said object image in a prescribed size which has the extracted position of said Between-the-Eyes candidate point at a center, and selecting a true candidate point from said Between-the- Eyes candidate points in accordance with a pattern discriminating process.

12. The apparatus for extracting a face position according to claim 11, wherein
said Between-the-Eyes detecting filter is one rectangle divided into six segments.

13. The apparatus for extracting a face position according to claim 11, wherein
said six rectangles includes
two first rectangles adjacent to each other in a vertical direction,
two second rectangles displaced relative to said first rectangles by a prescribed amount in said vertical direction, and adjacent to each other in said vertical direction, and
two third rectangles displaced relative to said second rectangles by a prescribed amount in said vertical direction, and adjacent to each other in said vertical direction.

14. The apparatus for extracting a face position according to claim 11, wherein
said selecting unit includes
an eye detecting unit detecting positions of eyes through a pattern discriminating process with respect to said object image that corresponds to prescribed two rectangles among rectangles forming said Between-the-Eyes detecting filter,
a correcting unit correcting the position of said Between-the-Eyes candidate point to a middle point between two eyes based on said detected positions of the eyes,
a rotating unit rotating an input image around said corrected position of Between-the-Eyes candidate point such that the two eyes are aligned horizontally, and
a discriminant process unit extracting from said rotated input image a portion of said object image in a prescribed size which has the corrected position of said Between-the-Eyes candidate point at a center, and selecting a true candidate point from said Between-the-Eyes candidate points in accordance with a pattern discriminating process.

15. The apparatus for extracting a face position according to claim 11, wherein
said imaging unit includes
a preparing unit preparing said object image as a stereo image, and
said selecting unit includes
a select processing unit selecting a true candidate point from said Between-the-Eyes candidate points in accordance with a distance to said Between-the-Eyes candidate point from an observation point that is detected based on said stereo image.

* * * * *